(12) United States Patent
Morooka

(10) Patent No.: US 8,390,837 B2
(45) Date of Patent: Mar. 5, 2013

(54) INFORMATION PROCESSING APPARATUS, PRINT SETTING CONTROL METHOD, AND COMPUTER-READABLE STORAGE MEDIUM

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 12/349,766

(22) Filed: Jan. 7, 2009

(65) Prior Publication Data

US 2009/0201540 A1 Aug. 13, 2009

(30) Foreign Application Priority Data

Jan. 8, 2008 (JP) .................... 2008-001593

(51) Int. Cl.
*G06K 15/00* (2006.01)
(52) U.S. Cl. ...................... 358/1.14; 358/1.16
(58) Field of Classification Search ............... 358/1.15, 358/500, 501, 400, 401, 1.16, 1.14, 1.6, 1.9
See application file for complete search history.

(56) References Cited

U.S. PATENT DOCUMENTS

| | | | | |
|---|---|---|---|---|
| 6,975,417 | B1 * | 12/2005 | Hilpl et al. ............... | 358/1.15 |
| 7,304,760 | B2 * | 12/2007 | Ferlitsch ................... | 358/1.15 |
| 7,315,885 | B2 * | 1/2008 | Weisshaar et al. ........... | 709/217 |
| 7,764,393 | B2 * | 7/2010 | Yamada et al. ............. | 358/1.15 |
| 2008/0037062 | A1 * | 2/2008 | Omino et al. ............... | 358/1.15 |
| 2008/0225325 | A1 * | 9/2008 | Chen et al. .................. | 358/1.14 |
| 2008/0259390 | A1 * | 10/2008 | Murase ...................... | 358/1.15 |
| 2009/0009801 | A1 * | 1/2009 | Tabuki ....................... | 358/1.15 |
| 2009/0021757 | A1 * | 1/2009 | Liu et al. ..................... | 358/1.13 |
| 2009/0128849 | A1 * | 5/2009 | Sakura ....................... | 358/1.15 |
| 2009/0147290 | A1 * | 6/2009 | Tomita ......................... | 358/1.9 |
| 2009/0217268 | A1 * | 8/2009 | Pandit et al. ................ | 718/100 |

FOREIGN PATENT DOCUMENTS

| | | |
|---|---|---|
| JP | 2002-202865 A | 7/2002 |
| JP | 2004-054900 A | 2/2004 |
| JP | 2004-157680 A | 6/2004 |
| JP | 2004-185534 A | 7/2004 |

* cited by examiner

*Primary Examiner* — Jerome Grant, II
(74) *Attorney, Agent, or Firm* — Canon USA, Inc., IP Division

(57) ABSTRACT

If a print setting of a print job causes any conflict (device conflict) in a network printer when the print job is executed, an information processing apparatus registers the print setting as a device conflict rule in a device conflict rule database. Then, the information processing apparatus performs a conflict determination based on device conflict rules registered in the device conflict rule database in addition to conflict rules registered beforehand in a conflict rule database.

12 Claims, 24 Drawing Sheets

ENTRY OF NEW JOB  ☒

| INPUT FILE(F): | AB.pdf | BROWSE(B)... |
|---|---|---|
| PRINTER NAME(P): | PRINTER A ▼ | |
| JOB TICKET(J): | Standard Job Ticket.jdf | BROWSE(W)... |

✓ THIS PRINTER IS READY FOR PRINTING.   [CONFLICT MODE SETTING]—901a

[UNUSABLE SETTING(O)...]  [PRINT SETTING(R)...]

| JOB NAME(N): | AB |
|---|---|
| USER NAME(U): | Administrator |
| OUTPUT METHOD(M): | 🖨 PRINT ▼ |
| NUMBER OF SETS OF COPIES(C): | 1 SETS |
| PRINT REGION: | ⦿ ALL(A) |
| | ○ DESIGNATION BY PAGE(G)  FROM [ ] TO [ ] |

[STORE JOB TICKET(T)]   [OK]   [CANCEL]   [HELP(H)]
                         901b    901c

FIG.11

| No. | MACHINE MODEL | FRIENDLY NAME | JOB CANCEL | SHEET SIZE | PUNCH | STAPLE | SADDLE | Z FOLDING | FU | FD | FEEDER PORT | DISCHARGE PORT | DETERMINATION |
|---|---|---|---|---|---|---|---|---|---|---|---|---|---|
| PRINT SETTING A | MACHINE MODEL AA | DEVICE A | ○ | A4 | | × | | | ○ | | CASSETTE 1 | TRAY 2 | PRESENCE |
| | | | | A3 | | × | | ○ | ○ | | CASSETTE 1 | TRAY 3 | |
| | | | | B5 | | × | | | ○ | | CASSETTE 1 | TRAY 2 | |
| PRINT SETTING B | MACHINE MODEL AA | DEVICE B | ○ | A3 | ○ | | | ○ | | ○ | CASSETTE 1 | TRAY 1 | ABSENCE |
| PRINT SETTING C | MACHINE MODEL BB | DEVICE C | ○ | A3 | × | | | ○ | ○ | | CASSETTE 3 | TRAY 1 | PRESENCE |
| | | | | A4 | × | | | | ○ | | INSERTER | TRAY 1 | |

| | PRINTER | | | | THRESHOLD = 3 |
|---|---|---|---|---|---|
| | A | B | C | D | DEVICE COMMON CONFLICT DETERMINATION |
| PRINT SETTING A | ○ | ○ | ○ | | NONE |
| PRINT SETTING B | ○ | | × | ○ | WARNING |
| PRINT SETTING C | × | × | × | | REGISTRATION |
| PRINT SETTING D | × | | × | | WARNING |

INFORMATION PROCESSING APPARATUS, PRINT SETTING CONTROL METHOD, AND COMPUTER-READABLE STORAGE MEDIUM

BACKGROUND OF THE INVENTION

1. Field of the Invention

The present invention relates to an information processing apparatus, a print setting control method, and a computer-readable storage medium. More specifically, the present invention provides a technique usable to perform processing relating to the conflict in the print setting.

2. Description of the Related Art

As discussed in Japanese Patent Application Laid-Open No. 2002-202865, there is a conventional technique relating to the conflict in the print setting, which prohibits any setting from being used if it is theoretically meaningless or cannot be processed by a printer. The discussed technique includes automatically generating a conflict rule complementally established based on conflict processing rules (a plurality of conflict processing rules registered beforehand in a system) and executing conflict processing necessary to perform the print setting using the automatically generated conflict rule.

In a workflow of a commercial printing service, such as Print On Demand (POD), to process a massive amount of sheets different in type and size, printers are often required to accept an exception setting (special setting applied only to a designated page/region, which is different from the entire setting). Accordingly, in the workflow of the commercial printing service such as POD, the number of print setting items increases and the number of combination patterns of the print setting increases correspondingly.

The following problems arise if the conflict processing is performed based on the conflict processing rules registered beforehand in the system as discussed in the above-described Japanese Patent Application Laid-Open No. 2002-202865.

(1) Potential Trouble Possibly Increasing

If the number of combination patterns of the print setting increases excessively, there will be an increased number of patterns that cannot be covered by the conflict processing rules. Therefore, many patterns will cause troubles because they are not subjected to the conflict processing to be performed.

(2) Incomplete Conflict Processing

The requirement to develop a printer capable of processing a massive amount of combination patterns of the print setting may lead a developer/manufacturer of the printer to choose the way of intentionally excluding part of the settings from the target of the conflict processing. As a result, some settings that cannot be processed by a printer may be transmitted to the printer and errors may be caused in the print processing.

Moreover, the following problems arise.

(3) Know-how to be Commonly Used

Because of complicatedness in the print setting, it is difficult to share the information relating to settings having caused any trouble. Therefore, a similar failure arises if the printer is used by another user.

(4) Difficulty in Introducing Conflict Processing

Complicatedness in the processing generally increases according to the number of combination patterns of the print setting. Therefore, when the conflict processing is introduced, a large number of man-hour will be required and the conflict processing cannot be easily introduced to the system.

SUMMARY OF THE INVENTION

Exemplary embodiments of the present invention are directed to a technique capable of accurately executing the conflict processing.

According to an aspect of the present invention, an information processing apparatus includes an acquisition unit configured to acquire an execution result of a print job from a printing apparatus, a first determination unit configured to determine whether processing corresponding to a print setting of the print job has been executed by the printing apparatus based on the execution result of the print job acquired by the acquisition unit, a first storage unit configured to store conflict information in a storage medium if the first determination unit determines that the processing corresponding to the print setting of the print job has not been executed to prohibit the print setting from being applied to at least the printing apparatus, and a second determination unit configured to determine based on the conflict information whether processing corresponding to a print setting of a print job to be executed according to an instruction of a user can be executed by a printing apparatus serving as an output destination of the print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIGS. 9A and 9B illustrate example print setting screens according to the first exemplary embodiment of the present invention.

FIG. 11 illustrates an example processing result obtained by the device status analysis processing according to the first exemplary embodiment of the present invention.

FIG. 22 illustrates an example storage content of a device conflict database according to the fifth exemplary embodiment of the present invention.

DETAILED DESCRIPTION OF THE EMBODIMENTS

Figure 1:
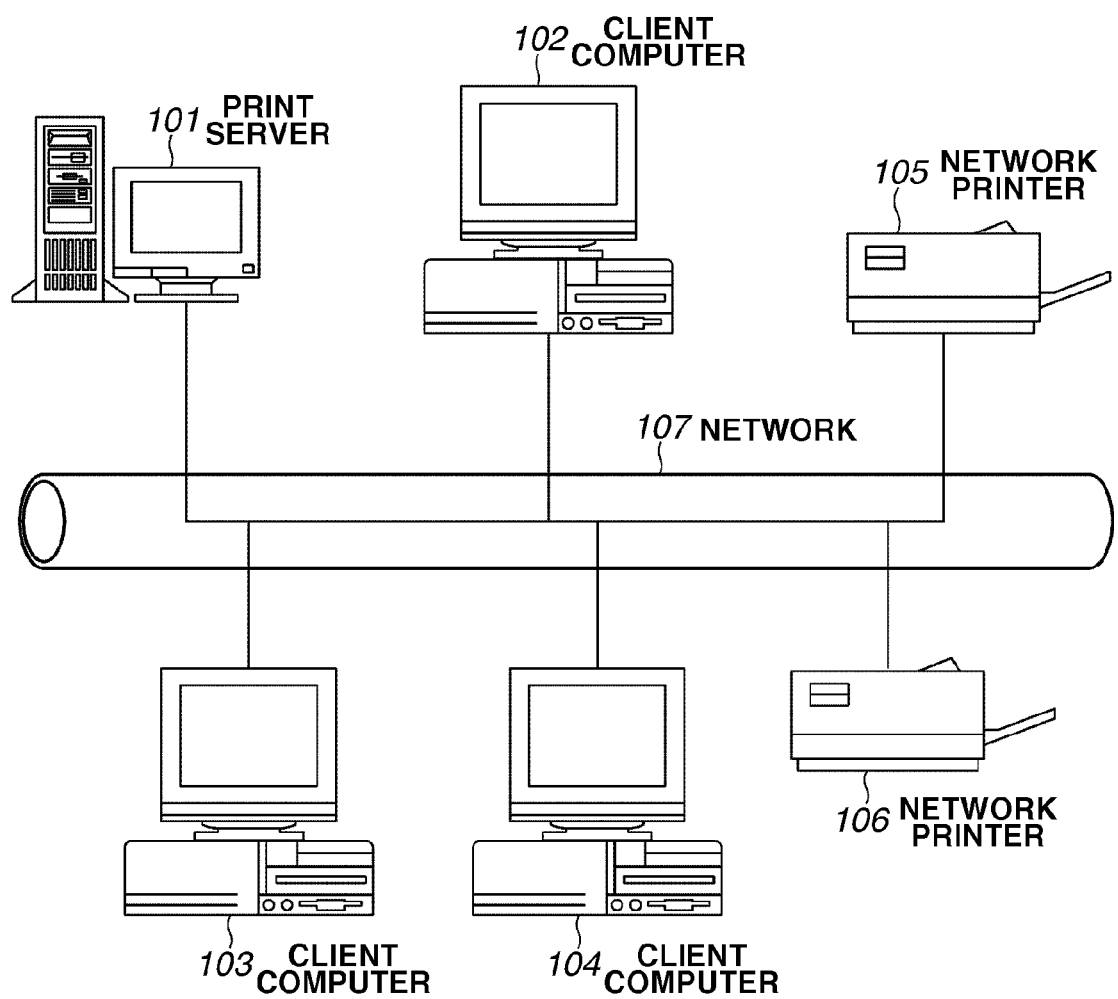
FIG. 1 is a block diagram illustrating an example configuration of a print management system according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 is a block diagram illustrating an example configuration of a print management system according to a first exemplary embodiment of the present invention. In FIG. 1, client computers 102 to 104 are information processing apparatuses connected to a network 107 via a network cable such as Ethernet®. The client computers 102 to 104 can execute various programs, including application programs. A printer driver having a function of converting print data into printer languages to be processed by network printers 105 and 106 is installed on the client computers 102 to 104. The client computers 102 to 104 can register a plurality of printer drivers. The print management system illustrated in FIG. 1 includes three client computers 102 to 104. However, the number of the client computers is not limited to three and can be any value larger than one.

A print server 101 is an information processing apparatus connected to the network 107 via the network cable. The print server 101 can store files to be used, which can be transmitted or received via the network 107. The print server 101 can monitor the state of the network 107. The print server 101 can manage the network printers 105 and 106 connected to the network 107. A plurality of general information processing apparatuses, performing mutually different controls based on print control programs installed thereon, can be used as the client computers 102 to 104 and the print server 101. Moreover, a single general information processing apparatus can be configured to function as the print server 101 and also function as the client computers 102 to 104.

When the print server 101 receives a print job including print data from the client computers 102 to 104, the print server 101 stores the print job in a storage medium and transmits the print job stored in the storage medium to the network printers 105 and 106. The network printers 105 and 106 perform print processing based on the print job received from the print server 101. The print server 101 acquires various information relating to the print job, such as print result of the network printers 105 and 106 and status of the job, and notifies the client computers 102 to 104 of the acquired information.

The network printers 105 and 106 include a network interface connected to the network 107. When the network printers 105 and 106 receive a print job including print data from the client computers 102 to 104, the network printers 105 and 106 analyze the print job and convert the print data into a dot image on a page-by-page basis. The network printers 105 and 106 execute the print job, i.e., print the dot image converted from the print data on the page-by-page basis. The network printers 105 and 106 can provide a print job management function, which is regulated according to ISO10175 (Document Printing Application (DPA)), to at least one of the print server 101 and the client computers 102 to 104.

The print management system illustrated in FIG. 1 includes two network printers 105 and 106. However, the number of the network printers is not limited to two and can be any value larger than one. The network printers 105 and 106 can be any type of printing apparatuses performing printing, such as laser beam printers, inkjet printers, and digital copy machines. The network 107 connects the client computers 102 to 104, the print server 101, and the network printers 105 and 106 to enable these apparatuses to communicate with each other. The network 107 can be realized by a wide area network (e.g., Internet) or a local area network (LAN).

Figure 2:
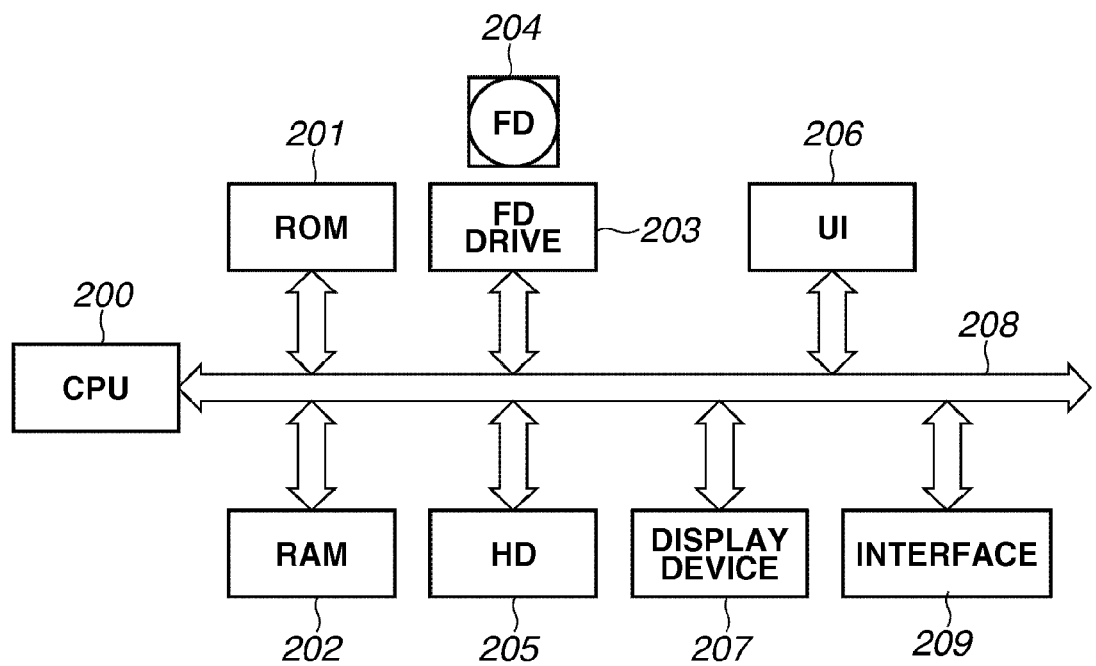
FIG. 2 is a block diagram illustrating an example hardware configuration of an information processing apparatus operable as a client computer and a print server according to the first exemplary embodiment of the present invention.

FIG. 2 is a block diagram illustrating an example hardware configuration of an information processing apparatus operable as the client computers 102 to 104 and the print server 101. The client computers 102 to 104 and the print server 101 can be realized by information processing apparatuses that are similar in hardware configuration. In FIG. 2, a central processing unit (CPU) 200 is a control unit of the information processing apparatus. The CPU 200 can execute programs stored in a hard disk (HD) 205. The programs to be executed by the CPU 200 are, for example, application programs, printer driver programs, an operating system (OS), and network printer control programs. When the CPU 200 executes a program, the CPU 200 performs a control for temporarily storing information and file(s) to be used in the execution of the program in a random access memory (RAM) 202.

A read-only memory (ROM) 201 is a storage medium storing programs including a basic I/O program and various data to be used in document processing, such as font data and template data. The RAM 202 is a storage medium that temporarily stores data and functions as a main memory or a work area for the CPU 200. A floppy disk (FD) drive 203 can be provided for a floppy disk (FD) 204, which serves as a storage medium. When the information processing apparatus requires program(s) stored in the FD 204, the program(s) can be loaded to the information processing apparatus via the FD drive 203. The storage medium is not limited to the FD and can be another storage medium arbitrarily selected from CD-ROM, CD-R, CD-RW, PC card, DVD, IC memory card, MO, and memory stick.

The HD 205 is an external storage apparatus, which can function as a mass storage memory. The HD 205 stores application programs, printer driver programs, OS, network printer control programs, and relevant programs. The HD 205 stores a spooler. The spooler for the client computers 102 to 104 can be referred to as a client spooler. The spooler for the print server 101 can be referred to as a server spooler. The print server 101 stores print job information received from the client computers 102 to 104 and a table to be used to control the print order in the HD 205.

A user interface (UI) 206 is an interface enabling a user to input various instructions. More specifically, the UI 206 includes a keyboard and a mouse. The user can operate the keyboard and the mouse of the UI 206 to input various instructions, such as control commands to be supplied to the network printers 105 and 106, to the information processing apparatus (i.e., the client computers 102 to 104 and the print server 101).

A display device 207 displays the control commands entered via the UI 206 and the operation status of the network printers 105 and 106. The display device 207 can be realized by a liquid crystal display (LCD). A system bus 208 is a data transmission path provided in the information processing apparatus (the client computers 102 to 104 and the print server 101). An interface 209 connects the information processing apparatus (the client computers 102 to 104 and the print server 101) to the network 107. The information processing apparatus (the client computers 102 to 104 and the print server 101) can transmit/receive data to/from an external apparatus via the interface 209.

Figure 3:
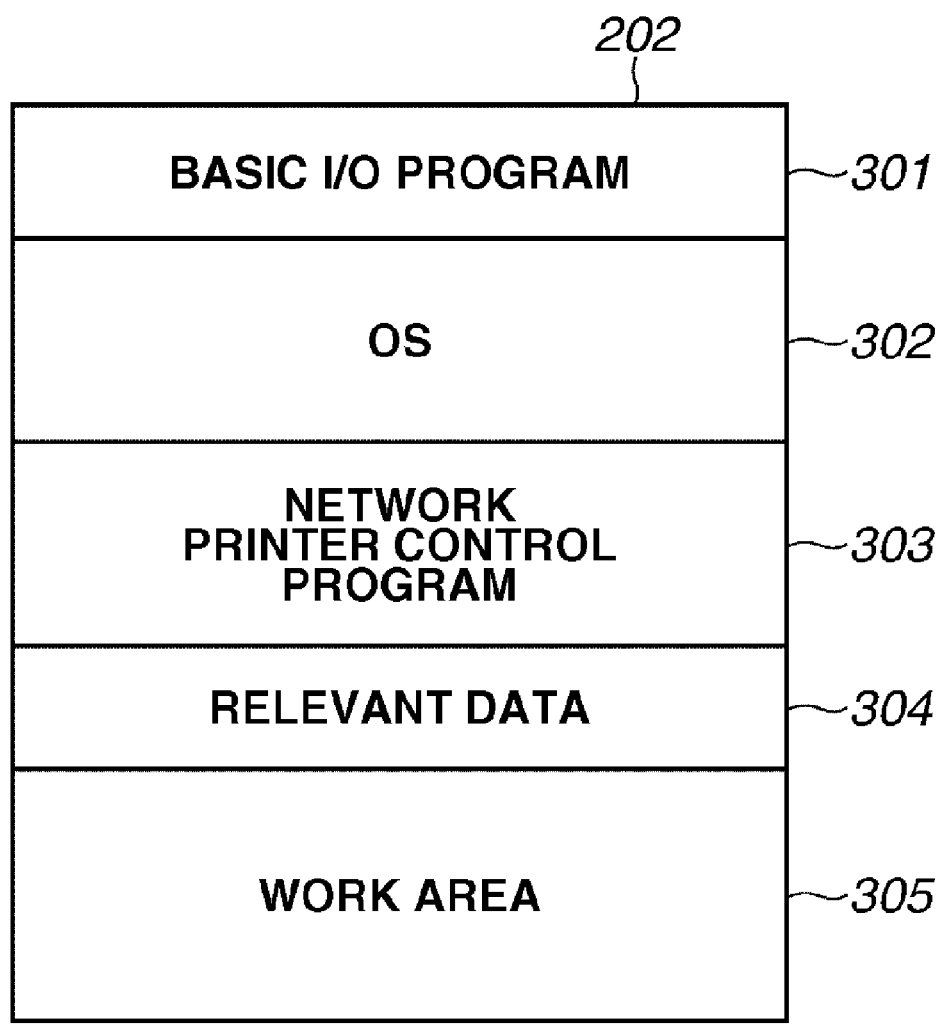
FIG. 3 illustrates an example memory map of a random access memory (RAM) according to the first exemplary embodiment of the present invention.

FIG. 3 illustrates an example memory map of the RAM 202 illustrated in FIG. 2. The CPU 200 can execute the network printer control program when the network printer control program is loaded from the FD 204 to the RAM 202. The memory map illustrated in FIG. 3 is in an executable state. In FIG. 3, a basic I/O program 301 includes a program having an initial program loading (IPL) function of loading the OS from the HD 205 to the RAM 202 in response to power ON of the information processing apparatus and starting a program by the OS. The RAM 202 has a plurality of areas respectively secured for OS 302, the network printer control program 303, and relevant data 304. The RAM 202 has a work area 305 to be used when the CPU 200 executes the network printer control program 303.

In the present exemplary embodiment, the network printer control program and the related data are directly loaded from the FD 204 to the RAM 202 and executed by the CPU 200. However, if the network printer control program is already installed on the HD 205, the network printer control program can be loaded from the HD 205 to the RAM 202. The storage medium storing the network printer control program 303 is not limited to the FD 204 and can be any other storage medium, such as CD-ROM, CD-R, PC card, DVD, and IC memory card. If the network printer control program 303 is already stored in the ROM 201, as part of the memory map, the CPU 200 can directly execute the network printer control program 303. Moreover, the above-described hardware devices can be replaced by any software capable of realizing functions comparable to those of the above-described devices.

In the following description, the network printer control program 303 is referred to as print control program 303. The print control program 303 includes a program enabling the client computers 102 to 104 to perform a control for instructing a print destination of a print job. The print control program 303 includes a program enabling the print server 101 to notify print termination of a print job and a print destination change request.

Figure 4:
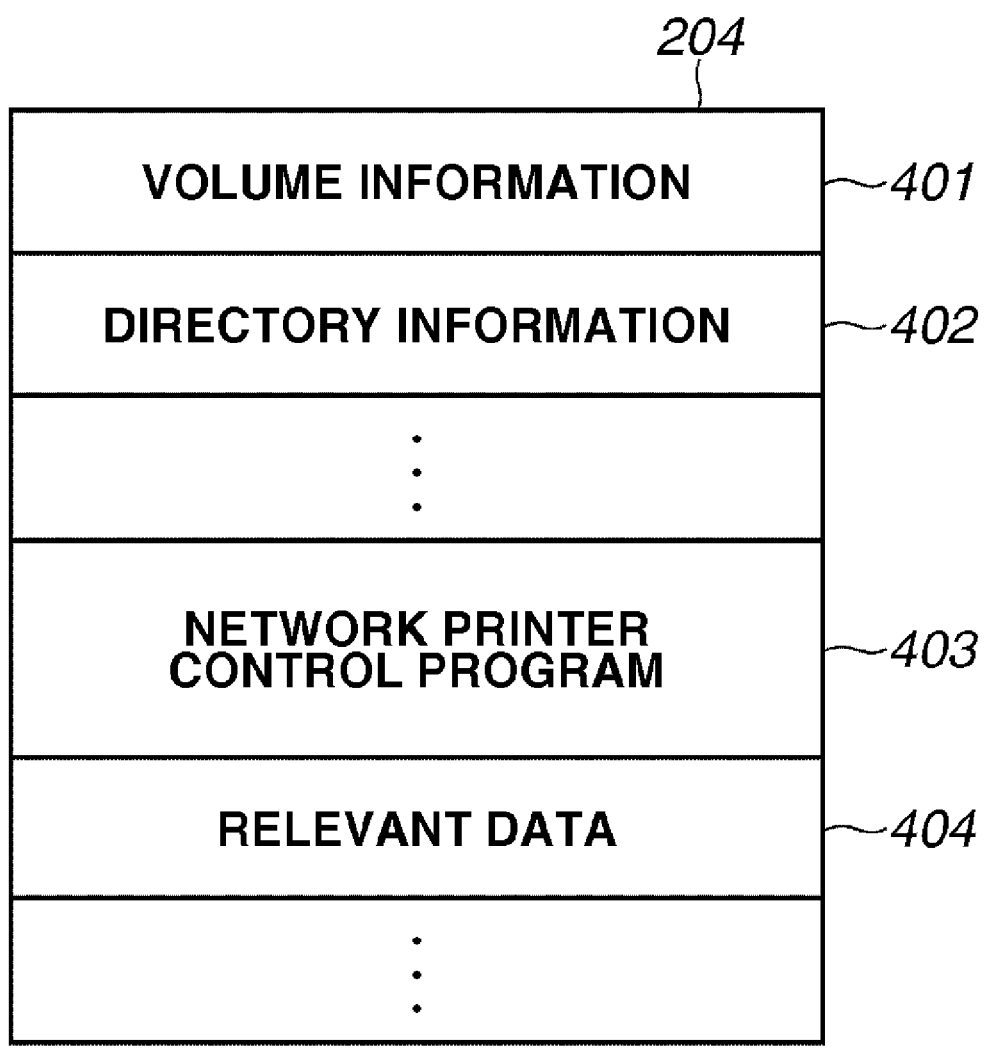
FIG. 4 illustrates an example memory map of a floppy disk (FD) according to the first exemplary embodiment of the present invention.

FIG. 4 illustrates an example memory map of the FD 204 illustrated in FIG. 2. The FD 204 stores volume information 401 indicating information relating to data, directory information 402, print control program 403 to be loaded in the RAM 202 as illustrated in FIG. 3, and relevant data 404 to be used when the print control program 403 is executed. The print control program 403 is a program programmed based on flowcharts described in the present exemplary embodiment. The print control program 403 stored in the FD 204 can be loaded in the RAM 202, and can be used as the print control program 303 illustrated in FIG. 3. As described previously, in the present exemplary embodiment, the client computers 102 to 104 and the print server 101 can execute the same print control program 403 loaded in the RAM 202.

Figure 5:
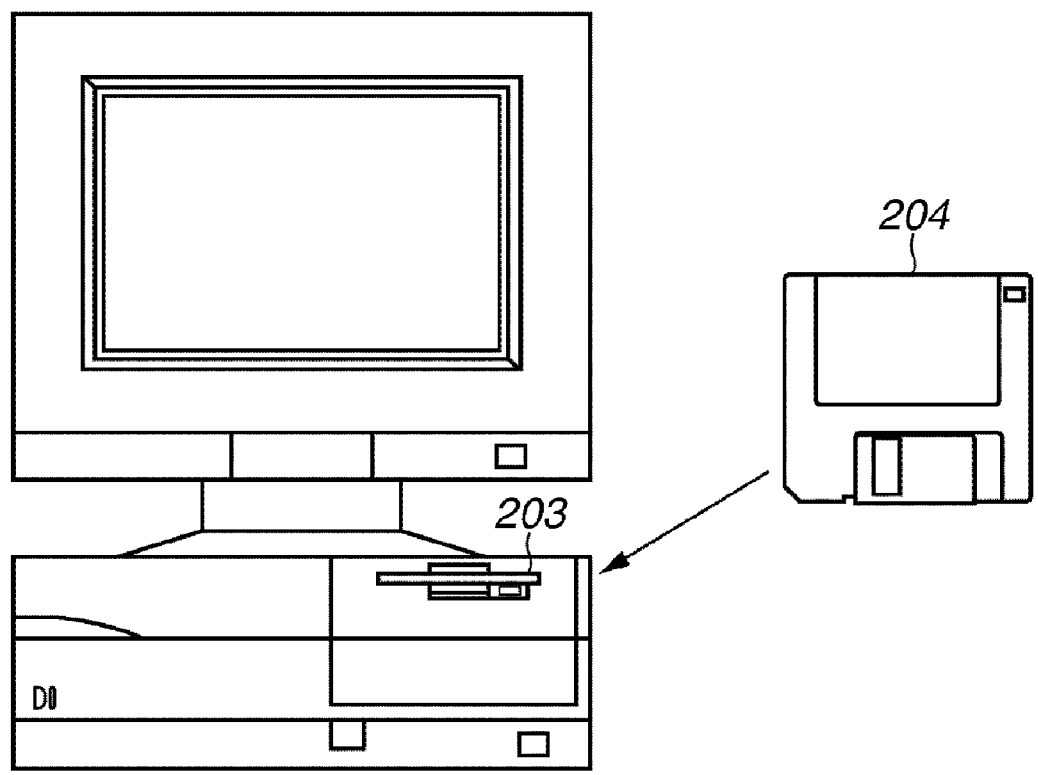
FIG. 5 illustrates an example relationship between a FD drive and a FD that can be inserted in the FD drive according to the first exemplary embodiment of the present invention.

FIG. 5 illustrates an example relationship between the FD drive 203 and the FD 204 that can be inserted in the FD drive according to the first exemplary embodiment of the present invention. In FIG. 5, the FD 204 stores the print control program 403 programmed based on the flowcharts and timing charts described in the present exemplary embodiment and the relevant data 404.

Figure 6:
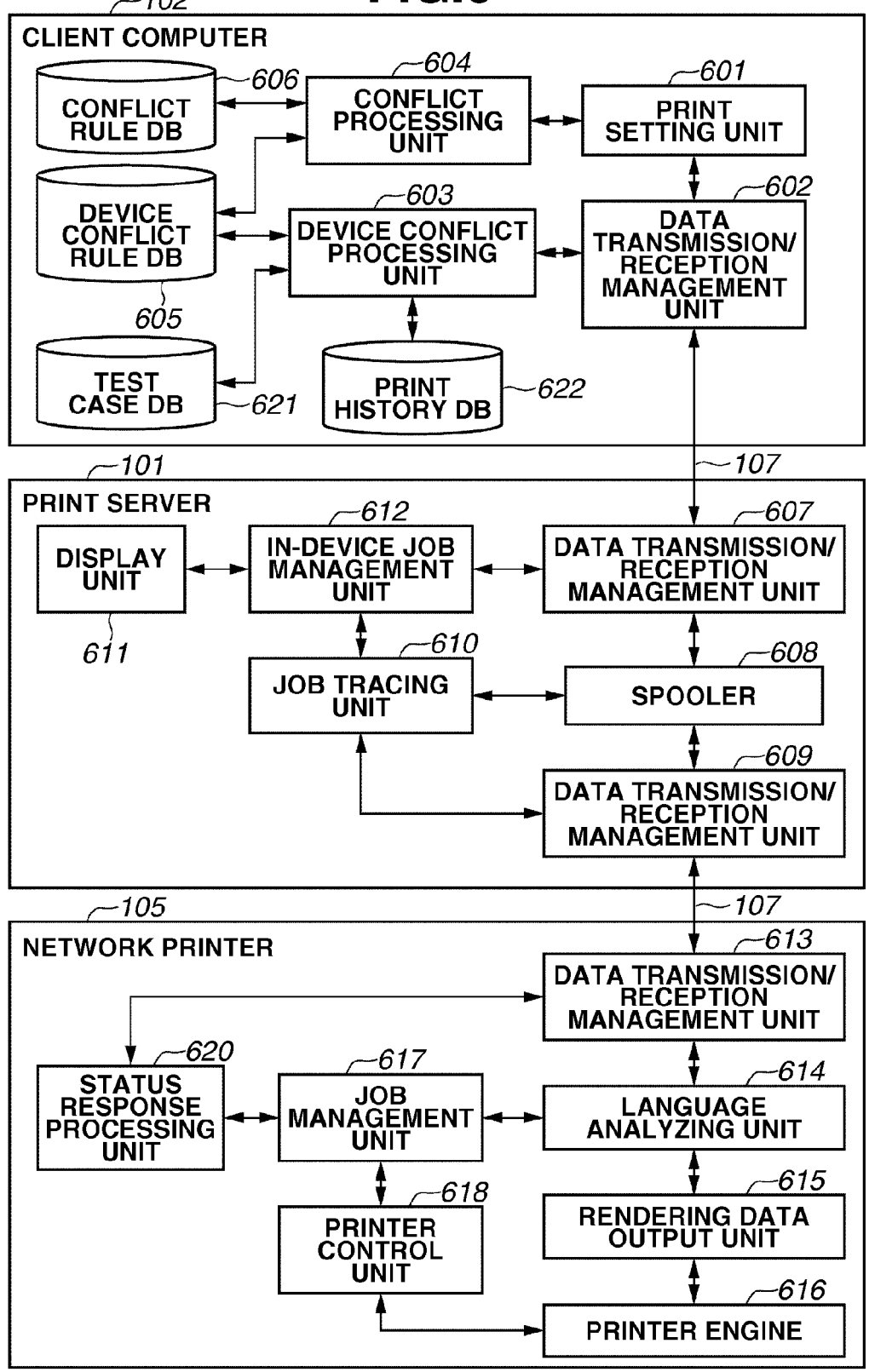
FIG. 6 is a block diagram illustrating an example functional configuration of the client computer, the print server, and a network printer according to the first exemplary embodiment of the present invention.

FIG. 6 is a block diagram illustrating an example functional configuration of the client computer 102, the print server 101, and the network printer 105. The client computers 102 to 104 are similar in functional configuration. The network printers 105 and 106 are similar in configuration. Therefore, the configurations illustrated in FIG. 6 are not limited to the client computer 102 and the network printer 105, and are applicable to the client computers 103 and 104 and the network printer 106 as well.

The client computer 102 includes a print setting unit 601, which displays print appearance instructions to be set to a print job, such as number of sets of printed copies, staple/imposition information, and punch instruction. The print setting unit 601 has a function of displaying a message as to the print setting or disabling print setting if the print setting has any conflict. For example, the print setting unit 601 displays a message for the print setting and indicates the setting item using a gray-out method. The conflict occurs in a situation where the print setting designated for a print job is theoretically meaningless as well as in a situation where the setting cannot be processed by a printer (e.g., the network printer 105) serving as an output destination of the print job. In the following description, the print setting may be simply referred to as "setting."

A conflict processing unit 604 provides a function of performing conflict processing on the setting generated by the print setting unit 601. As described previously, the conflict processing is performed to prohibit any setting if the setting is theoretically meaningless (e.g., if the setting indicates two-sided print processing to be performed on an OHP sheet) or if the setting cannot be processed by the printer. A conflict rule database (DB) 606 and a device conflict rule DB 605 are databases storing rules to be used in the conflict processing. The conflict rule DB 606 stores conflict rules registered beforehand. The device conflict rule DB 605 stores conflict rules obtained from results of print jobs having been executed. In the following description, the conflict rules stored in the device conflict rule DB 605 may be referred to as device conflict rules and can be discriminated from the conflict rules stored in the conflict rule DB 606.

A device conflict processing unit 603 has a function of receiving print result of the executed print job from a data transmission/reception management unit 602 and extending the device conflict rule if necessary. A test case DB 621 stores a print setting, if determined as a device conflict, as a test case to be tested by another printer. A print history DB 622 stores print histories of the print settings according to which the print processing has been correctly performed. The device conflict processing unit 603 can rewrite the information stored in the test case DB 621 and the print history DB 622.

The data transmission/reception management unit 602 has a function of transmitting data to the print server 101 via the network 107 and receiving data from the network printer 105 via the print server 101 and the network 107. The print server 101 includes a spooler 608 that receives a print job transmitted from the client computer 102 via a data transmission/reception management unit 607. The spooler 608 sequentially transmits the received print job to the network printer 105 via a data transmission/reception management unit 609.

The data transmission/reception management unit 607 has a function of transmitting data to the client computer 102 via the network 107 and receiving data from the client computer 102 via the network 107. The data transmission/reception management unit 609 has a function of transmitting data to the network printer 105 via the network 107 and receiving data from the network printer 105 via the network 107.

An in-device job management unit 612 has a function of acquiring a print job to be cached from the network printer 105 and supplying the acquired print job to a display unit 611. The in-device job management unit 612 has a function of receiving an instruction entered by a user who can operate a print setting screen (GUI) displayed on the display unit 611 and transmitting a control command (e.g., a print job cancel/stop command) to the network printer 105 via the data transmission/reception management unit 609.

A job tracing unit 610 traces, via the spooler 608, the print job executed (print processed) by the network printer 105 or a processing status of the print job cached by the in-device job management unit 612. The network printer 105 includes a data transmission/reception management unit 613, which has a function of transmitting data to the print server 101 via the network 107 and receiving data from the print server 101 via the network 107. For example, the data transmission/reception management unit 613 manages print job data and an attribute of the print job received from the print server 101.

A language analyzing unit 614 analyzes detailed contents of the print job data and decodes a print command, and executes control commands relating to management of the print job and rendering of data output, according to the print command. More specifically, the language analyzing unit 614 successively receives control command groups from a reception buffer of the data transmission/reception management unit 613 one by one, and investigates the contents of the received control commands according to description rules of the printer control language to identify processing to be performed according to the control commands.

If it is determined that the control command is a command relating to the print job or a command relating to the attribute of the print job, the language analyzing unit 614 issues a management command for the corresponding print job to a job management unit 617. For example, the command relating to the print job includes declarations indicating start and end of the print job. The command relating to the attribute of the print job includes commands relating to sheet size, number of sheets, staple, and punch. If the control command includes generation of rendering data such as characters, graphics, and images, the language analyzing unit 614 instructs a rendering data output unit 615 to output rendering data based on the corresponding print job.

The job management unit 617 issues selection commands (printer control commands), relating to sheet and discharge bin to be used, to a printer control unit 618 according to the attribute of the print job to be executed. The job management unit 617 acquires an operation state of the network printer 105 via the printer control unit 618 and constantly monitors the state of the print job being currently executed. When a predetermined condition (termination of the job, occurrence of an error, etc.) is satisfied, the job management unit 617 requests a status response processing unit 620 to return a status response.

The rendering data output unit 615 has a function of rasterizing rendering data and outputting characters, graphics, and images to be used in print output processing to a printer engine 616. For example, according to a rendering data output command sent from the language analyzing unit 614, the rendering data output unit 615 rasterizes the print data into a data format suitable for the output processing by creating designated characters patterns, performing calculation for graphics, and rasterizing image data. Then, the rendering data output unit 615 transmits the print data rasterized into the suitable data format to the printer engine 616.

The printer engine 616 performs print output processing. For example, the printer engine 616 forms images on a paper according to an electrophotographic image forming method based on the print data (output rasterized data) of the suitable data format converted by the rendering data output unit 615. The printer engine 616 includes a recording sheet residual amount detection unit and sends a warning signal to the printer control unit 618 if there is no sheet remaining. If there is no sheet to be used in rasterizing/print processing, the printer engine 616 stops the operation by a recording unit, such as a printer drum, and transmits an error signal to the printer control unit 618 while activating an interrupt unit.

The printer control unit 618 has a function of selecting sheets to be used according to the printer control command sent from the job management unit 617 and performing controls for the network printer 105 including initialization of the network printer 105. The printer control unit 618 constantly monitors information relating to a sheet feeder cassette used in the print processing, information relating to executed finishing (e.g., punch, staple, and saddle), information relating to a discharge port used for the discharged sheets, and information relating to a sheet conveyance path including usage of a reversing path. The printer control unit 618 has a function of notifying a print result when the print job is completed, if necessary, based on various information obtained by the monitoring. The information to be processed by the printer control unit 618 is stored in a memory provided in the printer control unit 618.

The status response processing unit 620 generates status response information if a status response request is received from the job management unit 617. More specifically, the status response processing unit 620 converts status notification, which is expressed according to an internal format of the network printer 105, into an appropriate format, which can be processed by the print server 101. Then, the status response processing unit 620 transmits the status response information to the data transmission/reception management unit 613. The data transmission/reception management unit 613 receives the status response information from the status response processing unit 620 and temporarily stores the status response information in a transmission buffer. Then, the data transmission/reception management unit 613 sends the stored status response information to the print server 101 via the network 107.

Figure 7:
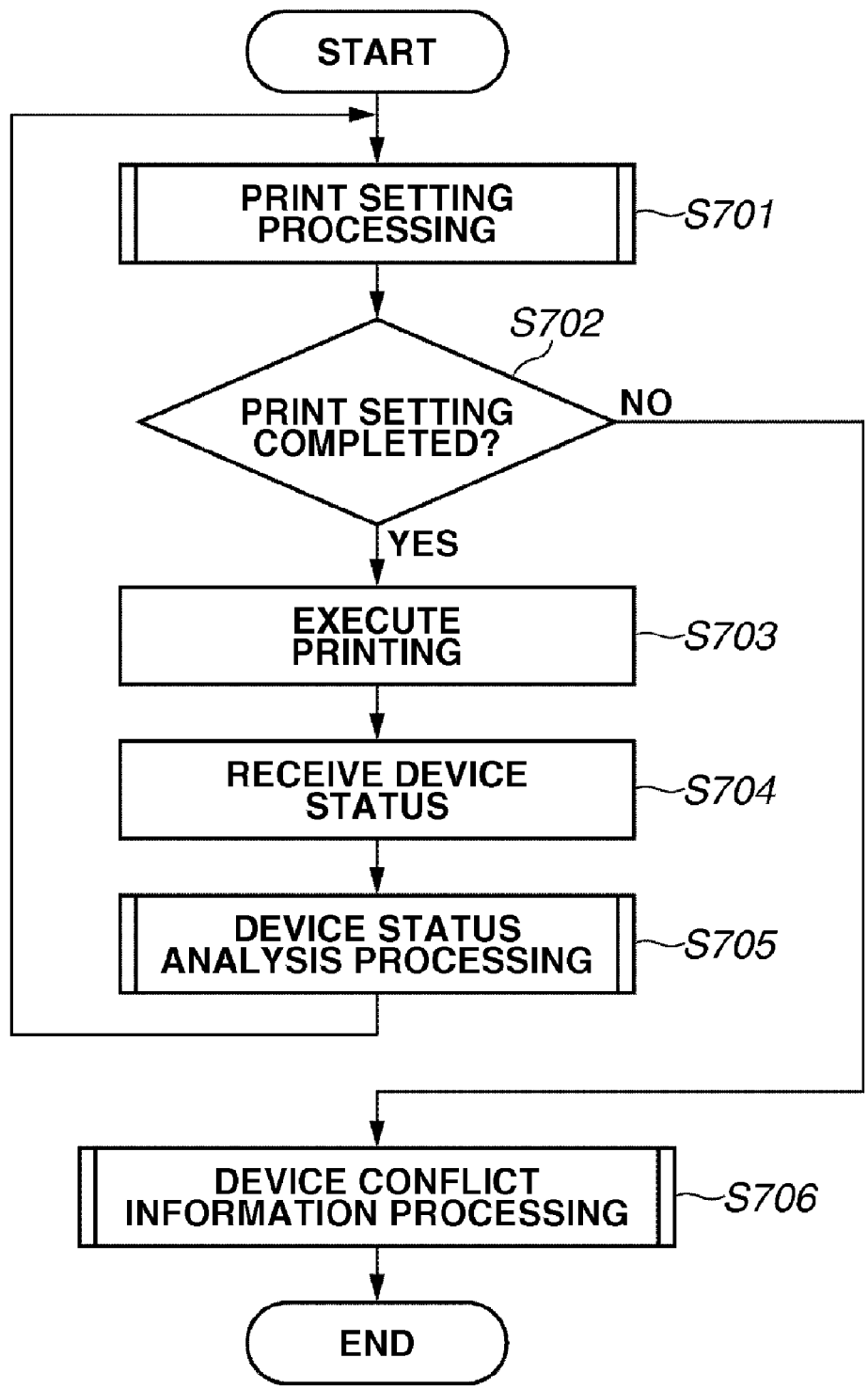
FIG. 7 is a flowchart illustrating an example basic processing flow according to the first exemplary embodiment of the present invention.

FIG. 7 is a flowchart illustrating an example basic processing flow according to the present exemplary embodiment. More specifically, the processing illustrated in FIG. 7 includes print setting to be performed by the print setting unit 601, conflict processing to be performed by the conflict processing unit 604, and device conflict processing to be performed by the device conflict processing unit 603. The print setting unit 601, the conflict processing unit 604, and the device conflict processing unit 603 can be realized by the CPU 200 of the client computer 102. Generation of the device conflict rule can be performed based on a print result received from the data transmission/reception management unit 602.

Figure 8:
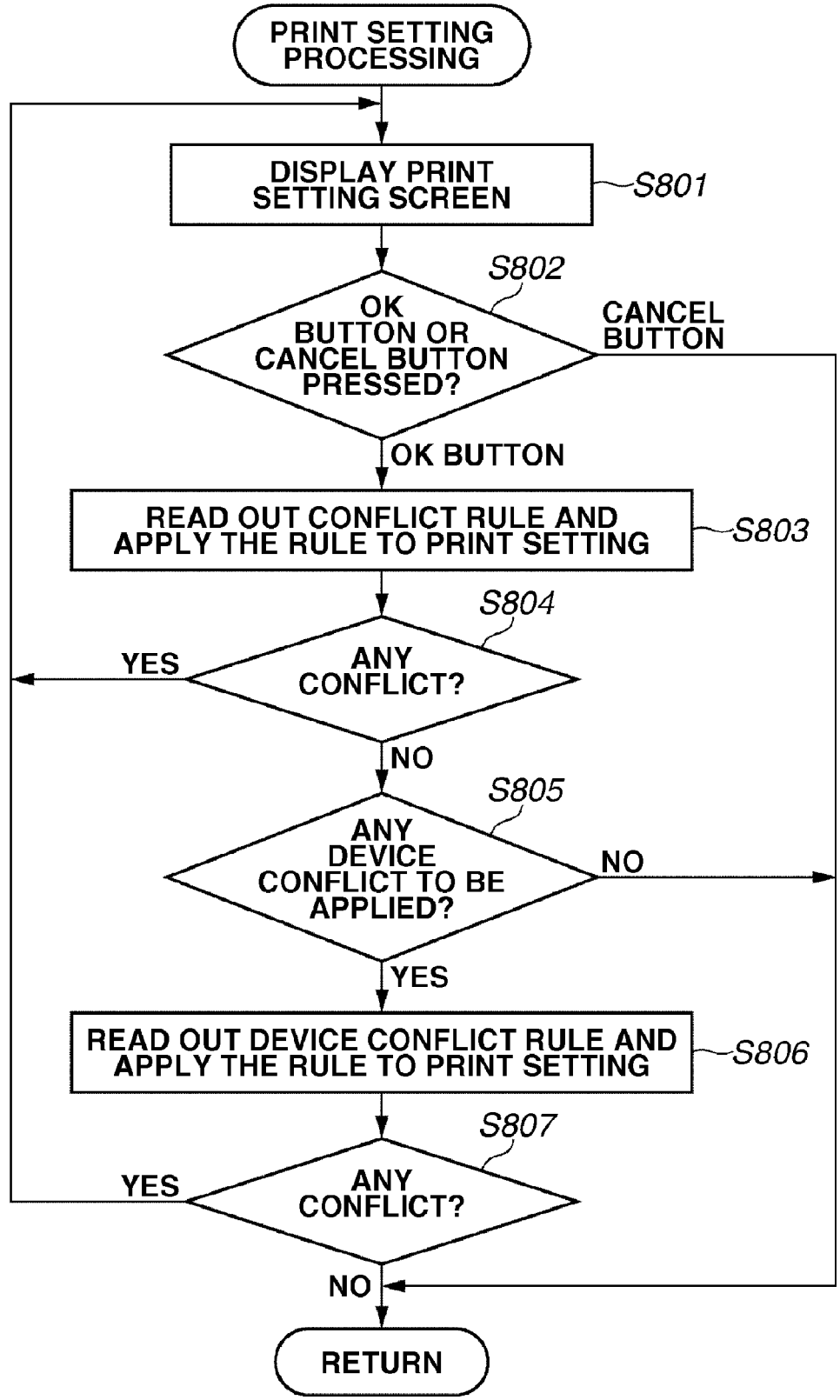
FIG. 8 is a flowchart illustrating detailed print setting processing to be performed in step S701 illustrated in FIG. 7.

In step S701, the CPU 200 performs print setting processing. FIG. 8 is a flowchart illustrating detailed print setting processing to be performed in step S701. In step S801, the print setting unit 601 displays a print setting screen (GUI) on the display device 207. FIG. 9A illustrates an example print setting screen 901. A user can use the print setting screen 901 to perform print setting and can also use the print setting screen 901 to determine whether to apply the device conflict and register a level (mode) to be used to detect the presence of any conflict when the device conflict is applied.

Figure 9B:
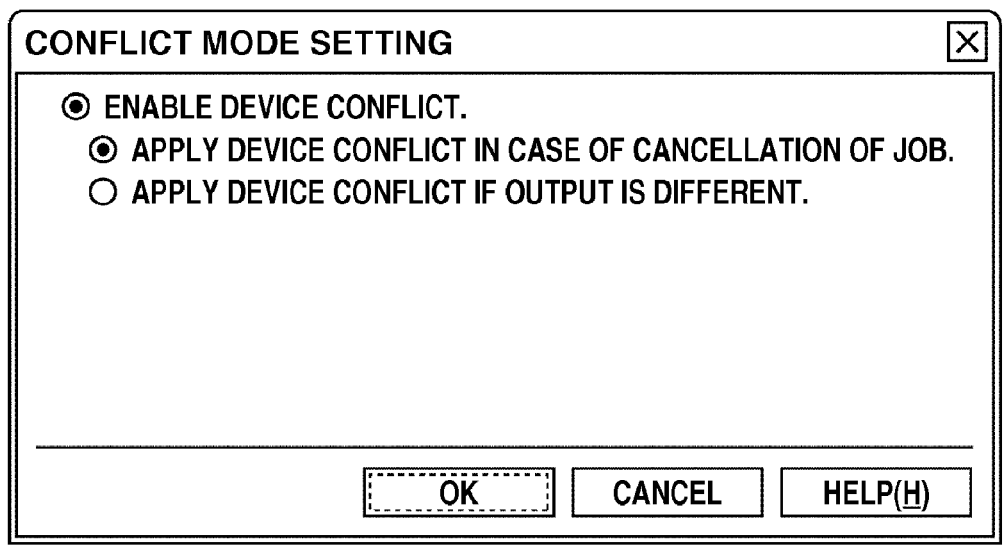

When the user presses a conflict mode setting button 901a on the print setting screen 901 illustrated in FIG. 9A, a conflict mode setting dialog 902 is displayed. The conflict mode setting dialog 902 enables the user to register the level to be used to detect the presence of any conflict. According to an example level (mode) illustrated in FIG. 9B, occurrence of a device conflict is recognized only when the print job is cancelled. According to another example level (mode) illustrated in FIG. 9B, occurrence of a device conflict is recognized when a behavior of the printer is contradictory to the print setting.

In step S802, the print setting unit 601 determines whether the user has pressed an OK button 901b (a button to be used to instruct execution of print processing) or a cancel button 901c on the print setting screen 901. If the print setting unit 601 determines that the OK button 901b has been pressed, the processing proceeds to step S803. If the print setting unit 601 determines that the cancel button 901c has been pressed, the CPU 200 terminates the routine of the flowchart illustrated in FIG. 8 and proceeds to step S702 of FIG. 7.

When the processing proceeds to step S803, the conflict processing unit 604 reads out the conflict rule from the conflict rule DB 606 and applies the conflict rule to the print setting performed in step S801. The conflict rule is registered beforehand in the conflict rule DB 606 (system). An example content of the conflict rule is described below. The conflict rule stored in the conflict rule DB 606 includes any settings/items being in an exclusive relationship.

| | FUNCTIONS CONFLICTING EACH OTHER | |
|---|---|---|
| 1 | OHP | TWO-SIDED PRINTING |
| 2 | OHP | PUNCH |
| 3 | STAPLE | PUNCH |
| . | . | . |
| . | . | . |
| . | . | . |

In step S804, the conflict processing unit 604 determines whether the readout conflict rule includes a combination pattern of the print setting performed in step S801. If the conflict processing unit 604 determines that the readout conflict rule includes the combination pattern of the print setting performed in step S801 (YES in step S804), the processing returns to step S801 because of the presence of the conflict. In step S801, the print setting unit 601 encourages the user to change the print setting. In this case, it is desired that the processing in step S801 includes notifying the user of generation of the conflict.

If the conflict processing unit 604 determines that the readout conflict rule does not include the combination pattern of the print setting performed in step S801 (NO in step S804), the processing proceeds to step S805. When the processing proceeds to step S805, the device conflict processing unit 603 determines whether application of the device conflict has been selected in step S801. If the device conflict processing unit 603 determines that the application of the device conflict has been selected (YES in step S805), the processing proceeds to step S806. If the device conflict processing unit 603 determines that the application of the device conflict has not been selected (NO in step S805), the CPU 200 terminates the routine of the flowchart illustrated in FIG. 8 and proceeds to step S702 of FIG. 7. As apparent from the above description, in the present exemplary embodiment, a third determination unit can be realized by the processing to be performed at least in step S805.

When the processing proceeds to step S806, the device conflict processing unit 603 reads out the device conflict rule from the device conflict rule DB 605 and applies the readout device conflict rule to the print setting performed in step S801. The conflict rule applied in step 806 is the device conflict rule. The device conflict rule stored in the device conflict rule DB 605 is the conflict rule extracted from the print execution result, which is not present in the initial state of the system.

In step S807, the device conflict processing unit 603 determines whether the readout device conflict rule includes a combination pattern of the print setting performed in step S801. If the device conflict processing unit 603 determines that the readout device conflict rule includes the combination pattern of the print setting performed in step S801 (YES in step S807), the processing returns to step S801 because the conflict is "present." In step S801, the print setting unit 601 encourages the user to change the print setting.

In this case, it is desired that the processing in step S801 includes notifying the user of generation of the conflict. If the device conflict processing unit 603 determines that the readout device conflict rule does not include the combination pattern of the print setting performed in step S801 (NO in step S807), the CPU 200 terminates the routine of the flowchart illustrated in FIG. 8 and proceeds to step S702 of FIG. 7. As apparent from the above description, in the present exemplary embodiment, a second determination unit can be realized by the processing to be performed at least in step S807.

Referring back to FIG. 7, in step S702, the print setting unit 601 determines whether the user has pressed any one of the OK button 901b and another predetermined buttons on the print setting screen 901 illustrated in FIG. 9A. If in step S702 the print setting unit 601 determines that the user has pressed the OK button 901b, the processing proceeds to step S703. If the print setting unit 601 determines that the user has pressed another predetermined button, the processing proceeds to step 706. When the processing proceeds to step S703, the print setting unit 601 outputs a print job generated according to the print setting performed in step S701 to the data transmission/reception management unit 602. The data transmission/reception management unit 602 transmits the print job generated according to the print setting to the print server 101. The print server 101 transmits the print job to the network printer 105.

In step S704, the data transmission/reception management unit 602 receives, from the print server 101, a processing status of the network printer 105 that has executed the print job. In this manner, in the present exemplary embodiment, an acquisition unit can be realized by the processing to be performed at least in step S704. In step S705, the device conflict processing unit 603 performs device status analysis processing for analyzing the processing status received in step S704.

Figure 10:
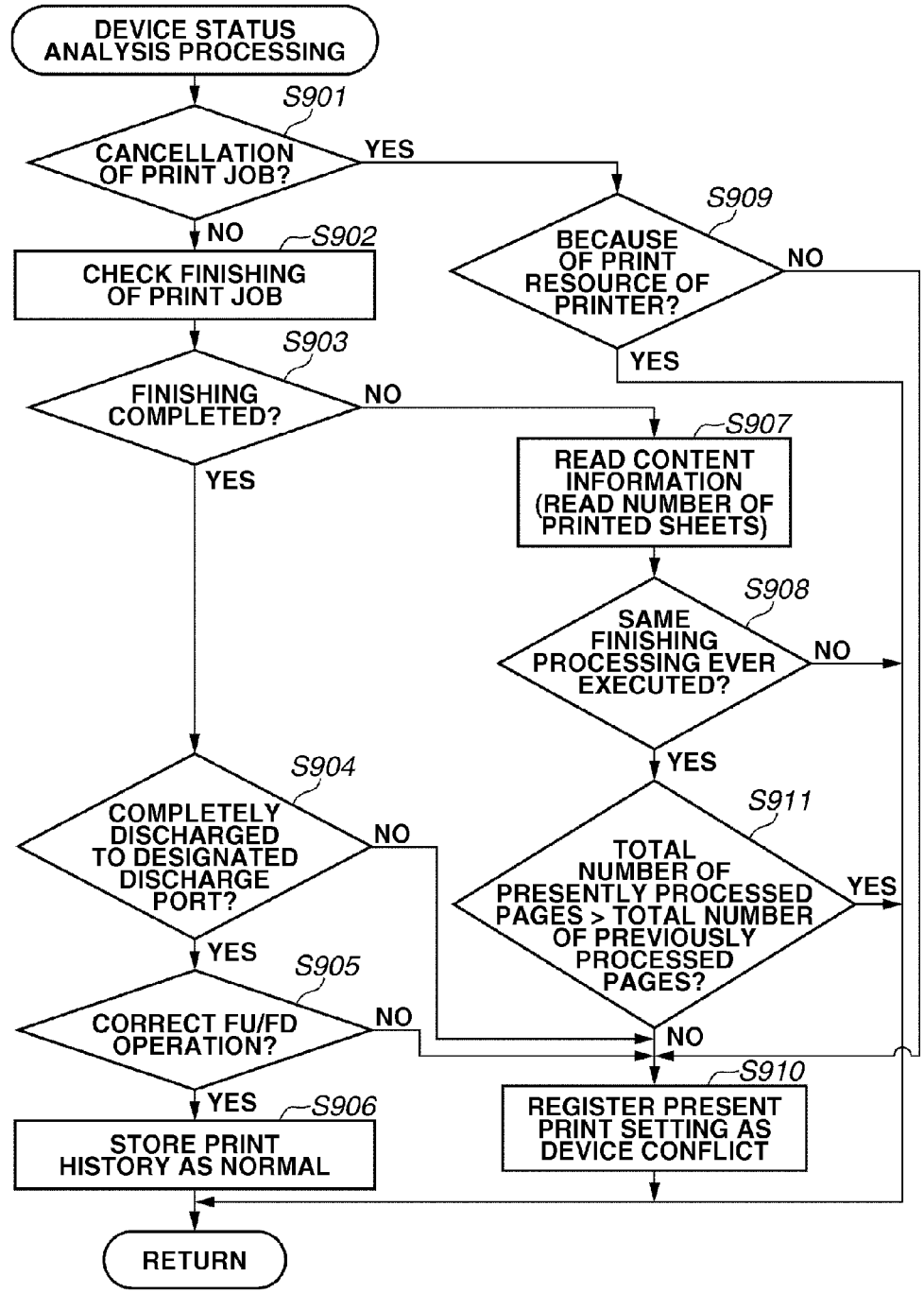
FIG. 10 is a flowchart illustrating detailed device status analysis processing to be performed in step S705 illustrated in FIG. 7.

FIG. 10 is a flowchart illustrating detailed device status analysis processing. According to the present exemplary embodiment, the following information (a) to (e) can be obtained as the processing status.

(a) job cancel information (presence of job cancellation and cause of the cancellation)
(b) print job information (total number of pages of the content)
(c) finishing information (information relating to finishing processing executed for the print job)
(d) discharge destination information (information relating to a discharge port of discharged sheets)
(e) discharge path information (information relating to a sheet reversing operation for reversing print surfaces)

In step S901, the device conflict processing unit 603 refers to the processing status received in step S704 and determines whether the print job is cancelled. If the device conflict processing unit 603 determines that the print job is not cancelled (NO in step S901), the processing proceeds to step S902. If the device conflict processing unit 603 determines that the print job is cancelled (YES in step S901), the processing proceeds to step S909. When the processing proceeds to step S909, the device conflict processing unit 603 determines whether the cancellation of the print job is caused by a print resource of the network printer 105 based on the processing status received in step S704. For example, the cause of the cancellation of the print job includes the shortage of a print resource (e.g., sheet or toner) in the network printer 105.

If the device conflict processing unit 603 determines that the cancellation of the print job is caused by the print resource of the network printer 105 (YES in step S909), the CPU 200 terminates the routine of the flowchart illustrated in FIG. 10 and proceeds to step S701 of FIG. 7. If the device conflict processing unit 603 determines that the cancellation of the print job is not caused by the print resource of the network printer 105 (NO in step S909), the device conflict processing unit 603 determines that the cancellation of the print job is caused by the print setting. The processing proceeds to step S910. When the processing proceeds to step S910, the device conflict processing unit 603 registers the device conflict rule including the present print setting, as a conflict "presence" setting, in the device conflict rule DB 605.

If in step S901 the print job is not cancelled and when the processing proceeds to step S902, the device conflict processing unit 603 reads out information relating to the executed finishing based on the processing status received in step S704. Then, the device conflict processing unit 603 checks a finishing state of the executed print job. In step S903, the device conflict processing unit 603 determines whether all of the finishing information designated in the print setting has been executed based on the result obtained in step S902. More specifically, the device conflict processing unit 603 determines whether the finishing has been executed thoroughly according to the print setting.

If the device conflict processing unit 603 determines that the finishing has been executed thoroughly according to the print setting (YES in step S903), the processing proceeds to step S904 and otherwise proceeds to step S907. When the processing proceeds to step S907, the device conflict processing unit 603 reads the number of content pages of the print job. In step S908, the device conflict processing unit 603 searches the print history DB 622 and determines whether finishing processing similar to the finishing processing having been checked in step S902 has ever been executed.

If the device conflict processing unit 603 determines that the finishing processing similar to the finishing processing having been checked in step S902 has ever been executed (YES in step S908), the processing proceeds to step S911 and otherwise proceeds to step S701 of FIG. 7 (namely, the CPU 200 terminates the routine of the flowchart illustrated in FIG. 10).

When the processing proceeds to step S911, the device conflict processing unit 603 refers to information relating to the total number of content pages of the past print job retrieved from the print history DB 622. Then, the device conflict processing unit 603 determines whether the total number of pages of the present print job (present processing target) is greater than the total number of pages obtained from the print history DB 622. If the device conflict processing unit 603 determines that the total number of pages of the present print job (present processing target) is greater than the total number of pages obtained from the print history DB 622 (YES in step S911), the CPU 200 terminates the routine of the flowchart illustrated in FIG. 10 and proceeds to step S701 of FIG. 7. In this case, the difference in total number of pages is the cause why the print job could not be finished and it can be determined that the conflict depends on the content.

If the device conflict processing unit 603 determines that the total number of pages of the presently executed print job is not greater than the total number of pages obtained from the print history DB 622 (NO in step S911), the conflict depends on the print setting and the processing proceeds to step S910. When the processing proceeds to step S910, the device conflict processing unit 603 registers a device conflict rule including the present print setting, as a conflict "presence" setting, in the device conflict rule DB 605.

As described previously, if in step S903 it is determined that the finishing has been thoroughly executed according to the print setting, the processing proceeds to step S904. When the processing proceeds to step S904, the device conflict processing unit 603 determines whether a print product has been output to a discharge destination designated by the print setting based on the processing status received in step S704. If the device conflict processing unit 603 determines that the print product has been output to a discharge destination not designated by the print setting (NO in step S904), the processing proceeds to step S910. The device conflict processing unit 603 registers the device conflict rule including the present print setting, as a conflict "presence" setting, in the device conflict rule DB 605.

If only the discharge destination designated by the print setting is used, it can be determined that the discharge destination setting has been correctly operated and the processing proceeds to step S905. When the processing proceeds to step S905, the device conflict processing unit 603 determines whether the used discharge path is only one. For example, the device conflict processing unit 603 determines whether a sheet surface switching processing path is fixed to face-up (FU) or face-down (FD) during discharge processing in a one-side printing operation.

If the device conflict processing unit 603 determines that the used discharge path is only one (YES in step S905), it can be determined that the print result is correct and the processing proceeds to step S906. When the processing proceeds to step S906, i.e., when the print job is correctly executed (printed), the device conflict processing unit 603 registers the print setting and print job content information (e.g., total number of content pages) in the print history DB 622. As apparent from the above description, in the present exemplary embodiment, a second storage unit can be realized by the processing to be performed at least in step S906. If the device conflict processing unit 603 determines that the used discharge path is not only one (NO in step S905), it can be determined that there is a conflict caused by the print setting and the processing proceeds to step S910. When the processing proceeds to step S910, the device conflict processing unit 603 registers the device conflict rule including the present print setting, as a conflict "presence" setting, in the device conflict rule DB 605.

The data registered in the device conflict rule DB 605 in step S910 includes information relating to a machine model that has performed print processing for the print job (processing target) and information relating to function(s) used by the network printer 105 according to each print setting. FIG. 11 illustrates an example processing result obtained by the device status analysis processing. In the present exemplary embodiment, the content illustrated in FIG. 11 is stored in the device conflict rule DB 605.

In FIG. 11, if a determination result "presence" is described in the field of device conflict determination, the print setting is registered as having caused a device conflict in the device conflict rule DB 605. As apparent from the above description, in the present exemplary embodiment, a first storage unit can be realized by the processing to be performed at least in step S910. In the present exemplary embodiment, conflict information can be realized by the device conflict rule stored in the device conflict rule DB 605. In the present exemplary embodiment, a first determination unit can be realized by the processing to be performed at least in steps S901, S903 to S905, S908, S909, and S911.

Referring back to FIG. 7, as described previously, if in step S702 any predetermined button other than the OK button 901b on the print setting screen 901 illustrated in FIG. 9A is pressed, the processing proceeds to step S706. A user may apply the content of the device conflict rule detected in step S705 also to a network printer (device) different in machine model. Therefore, in step S706, the device conflict processing unit 603 checks beforehand the presence of any device conflict in the network printer (device) different in machine model. The network printer different in machine model is, for example, a printer developed by a different vendor or a printer of the same vendor which is different in the configuration of a finishing option connected to the printer.

Figure 12:
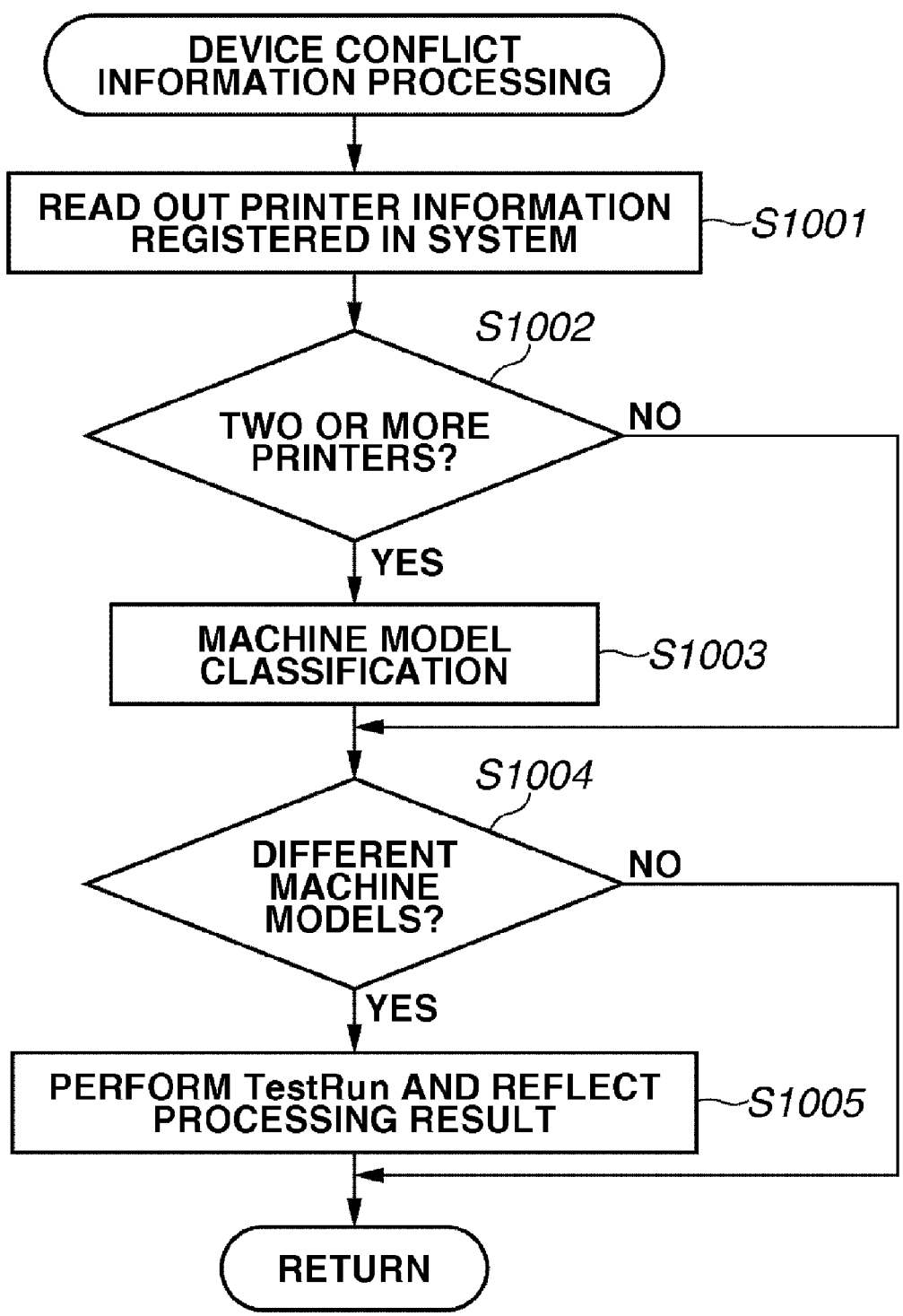
FIG. 12 is a flowchart illustrating detailed device conflict information processing to be performed in step S706 illustrated in FIG. 7.

FIG. 12 is a flowchart illustrating detailed device conflict information processing to be performed in step S706. In step S1001, the device conflict processing unit 603 detects network printer information registered in the system. In step S1002, the device conflict processing unit 603 determines whether the number of network printers detected in step S1001 is two or more. If the device conflict processing unit 603 determines that the number of the network printers detected in step S1001 is two or more (YES in step S1002), the processing proceeds to step S1003 and otherwise proceeds to step S1004 while skipping step S1003.

When the processing proceeds to step S1003, the device conflict processing unit 603 registers an appropriate one of a plurality of network printers as a target of the device conflict processing, if they are identical in machine model. The network printers of the same machine model are, for example, printers of the same machine model or printers having the same finishing option.

In step S1004, the device conflict processing unit 603 determines whether the network printer detected in step S1001 is the network printer of the machine model having been subjected to the device conflict "presence" setting in step S910. If the device conflict processing unit 603 determines that the network printer detected in step S1001 is not the network printer of the machine model having been subjected to the device conflict "presence" setting in step S910 (YES in step S1004), it is necessary to check the presence of any device conflict rule. The device conflict processing unit 603 registers the print setting having caused the device conflict and information relating to a network printer to be used to execute the print job, as a test case, in the test case DB 621. Then, the processing proceeds to step S1005.

If the determination condition in step S1004 is not satisfied (NO in step S1004), it is unnecessary to newly check the presence of any device conflict rule. Therefore, the CPU 200 terminates the routine of the flowchart illustrated in FIG. 12.

When the processing proceeds to step S1005, the device conflict processing unit 603 executes TestRun. In the present exemplary embodiment, the device conflict processing unit 603 executes the test case registered in the test case DB 621. In this case, if the processing of step S1005 is registered as processing to be executed when the network printer 105 is not busy, the system can automatically start the processing of step S1005.

In the TestRun, it is checked if the print data and the content can be processed by the network printer. More specifically, in the TestRun, the device conflict processing unit 603 generates a null content and a print job including only a portion relating to the conflict as a conflict confirmation job. The device conflict processing unit 603 transmits the generated content and the conflict confirmation job to the network printer.

Although a detailed method for the TestRun is not described in the present exemplary embodiment, the method for the TestRun is a known technique. The processing to be performed in step S1005 can be realized by generating the print job dedicated to conflict confirmation and executing the above-described sequential processing of steps S703, S704, and S705. Then, the device conflict processing unit 603 stores an execution result of the test case, as a device conflict rule, in the device conflict rule DB 605. As apparent from the above description, in the present exemplary embodiment, a test unit can be realized by the processing to be performed at least in step S706.

As apparent from the above description, in the present exemplary embodiment, a print setting having caused any conflict (device conflict) in the network printer 105 when a print job is executed is registered as a device conflict rule in the device conflict rule DB 605. Then, the conflict determination is performed based on the device conflict rule registered in the device conflict rule DB 605 in addition to the conflict rule registered beforehand in the conflict rule DB (system). As described above, accuracy in the conflict determination can be improved by analyzing the result of the print setting, if the print processing is failed, and registering the analysis result as a device conflict.

Next, a second exemplary embodiment of the present invention is described. According to the above-described first exemplary embodiment, the device conflict processing unit 603 is provided in the client computer 102 as illustrated in FIG. 6. The present exemplary embodiment includes the device conflict processing unit 603 provided in the print server 101. Therefore, an application operating on the client computer needs not perform any special conflict processing to apply conflict processing to the print setting. In this manner, the present exemplary embodiment is different from the above-described first exemplary embodiment mainly in the apparatus to which the device conflict processing unit 603 is installed. Accordingly, the following description of the present exemplary embodiment does not include any detailed description with respect to constituent components and portions similar to those described in the above-described first exemplary embodiment.

Figure 13:
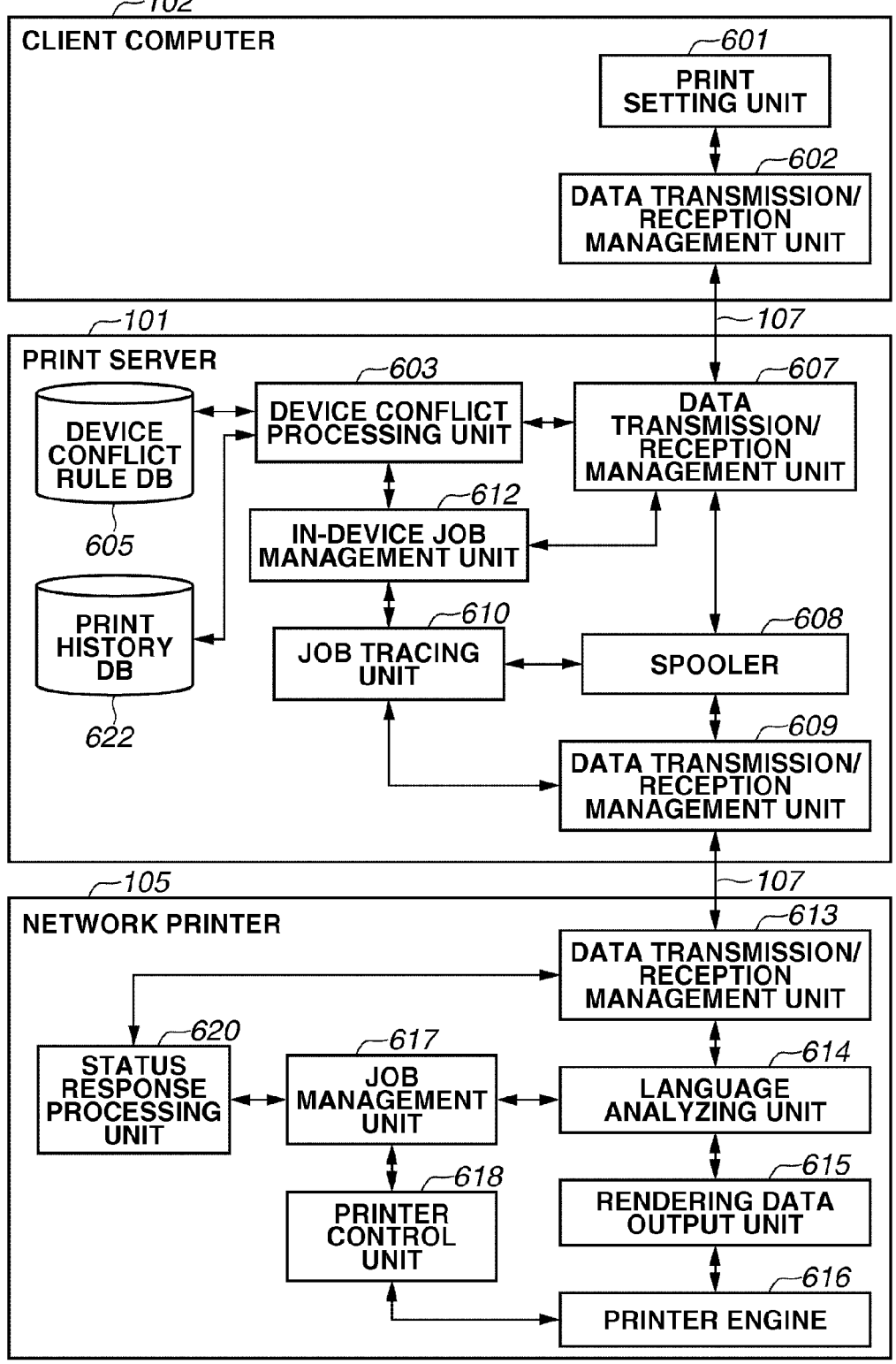
FIG. 13 is a block diagram illustrating an example functional configuration of the client computer, the print server, and the network printer according to a second exemplary embodiment of the present invention.

FIG. 13 is a block diagram illustrating an example functional configuration of the client computer 102, the print server 101, and the network printer 105. Similar to FIG. 6, the configuration illustrated in FIG. 13 includes only one client computer and only one network printer. However, the number of the client computers and the number of the network printers can be two or more.

The print setting unit 601 displays print appearance instructions, such as number of sets of printed copies, imposition information, and staple/punch instruction, to be set to a print job. The print setting unit 601 can be configured to have a function of displaying a conflict processing result corresponding to the print setting, which is notified from the print server 101. The data transmission/reception management unit 602 has a function of transmitting data to the print server 101 via the network 107 and receiving data from the network printer 105 via the print server 101 and the network 107.

The device conflict processing unit 603, corresponding to the device conflict processing unit 603 illustrated in FIG. 6, applies conflict processing to print job information received from the data transmission/reception management unit 607. The device conflict rule DB 605, corresponding to the device conflict rule DB 605 illustrated in FIG. 6, is a database capable of storing device conflict rules to be used in the conflict processing. Any print job, if it includes a conflict "presence" print setting defined by the device conflict rule, is canceled. The device conflict processing unit 603 has a function of receiving a result of executed print processing from the in-device job management unit 612 and, if necessary, enhancing the device conflict rule. If the print processing is correctly completed, the print setting used for the print processing is registered in the print history DB 622.

Figure 14:
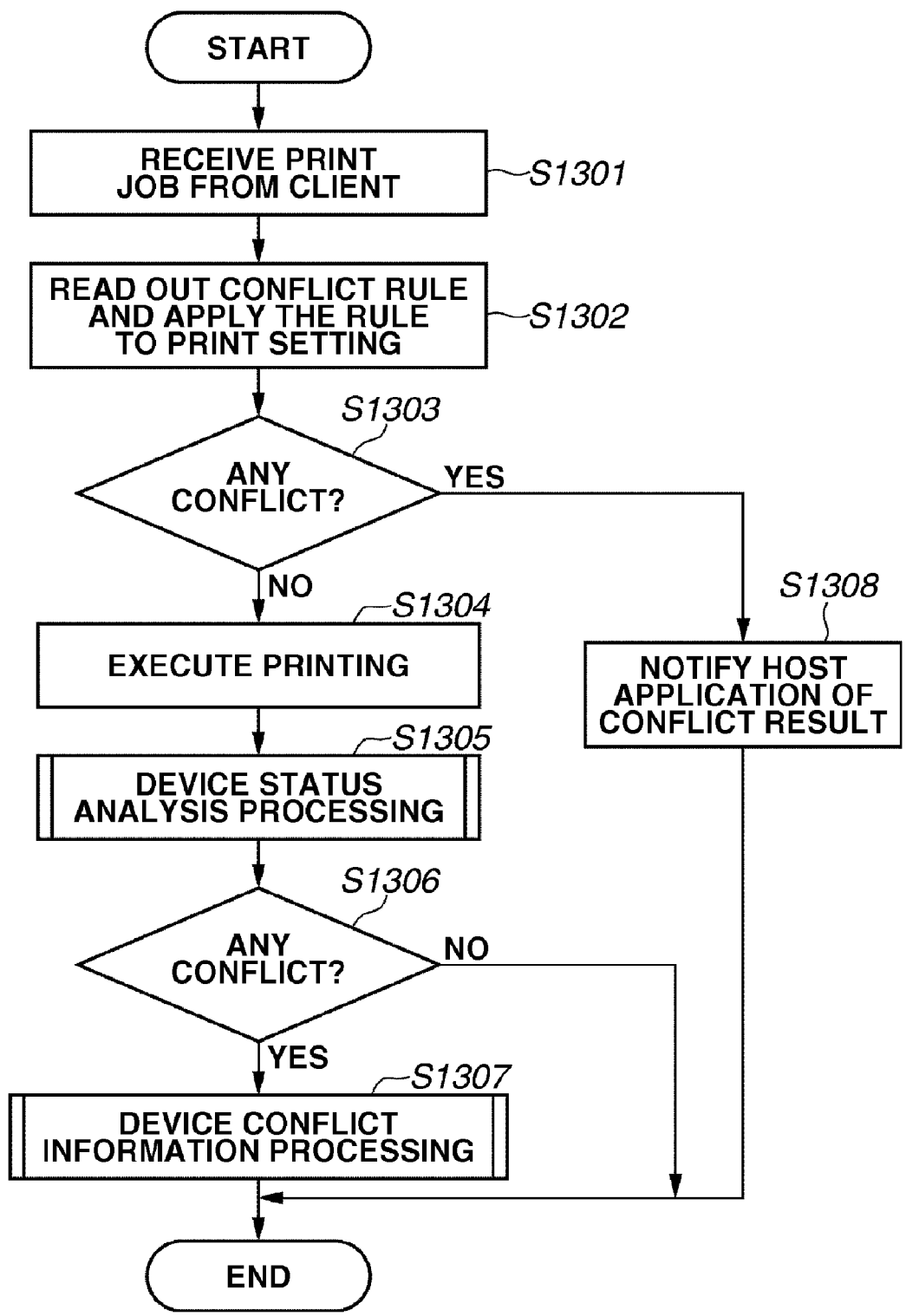
FIG. 14 is a flowchart illustrating an example basic processing flow according to the second exemplary embodiment of the present invention.

FIG. 14 is a flowchart illustrating an example basic processing flow according to the present exemplary embodiment. More specifically, FIG. 14 is a flowchart illustrating example processing to be performed by the print server 101 in response to transmission of a print job.

In step S1301, the device conflict processing unit 603 acquires a print job whose print setting is determined by the client computer 102 via the data transmission/reception management unit 607. As apparent from the above description, in the present exemplary embodiment, a reception unit can be realized by the processing to be performed at least in step S1301. In step S1302, the device conflict processing unit 603 reads out the print setting from the print job acquired in step S1301 and reads out the conflict rule from the device conflict rule DB 605. Then, the device conflict processing unit 603 applies the readout conflict rule to the readout print setting. While the device conflict processing unit 603 performs the above-described processing, the print job is spooled in the spooler 608 and execution of the print job is temporarily stopped so that printing cannot be performed.

In step S1303, the device conflict processing unit 603 determines whether the device conflict rule read out of the device conflict rule DB 605 includes any combination pattern of the print setting read out of the print job. If the device conflict processing unit 603 determines that the device conflict rule read out of the device conflict rule DB 605 does not include any combination pattern of the print setting read out of the print job (NO in step S1303), the processing proceeds to step S1304. If the determination in step S1303 is YES, the device conflict processing unit 603 can identify the presence of any conflict. Thus, the processing proceeds to step S1308. As apparent from the above description, in the present exemplary embodiment, the second determination unit can be realized by the processing to be performed at least in step S1303.

Similar to the above-described first exemplary embodiment, in the present exemplary embodiment, it is possible to determine whether application of the device conflict is selected, for example, by adding information indicating the application of the device conflict to the print job received in step S1301. Then, only when it is determined that the application of the device conflict is selected, the processing of step S1303 can be performed. In this case, for example, the third determination unit can be realized by the device conflict processing unit 603 configured to determine whether the print job received in step S1301 includes the information indicating the application of the device conflict.

When the processing proceeds to step S1308, the spooler 608 deletes the retained print job and stops the processing because the print setting includes the conflict. Then, the data transmission/reception management unit 607 notifies a host application program (the print setting unit 601) of the conflict result via the data transmission/reception management unit 602.

As described previously, if in step S1303 it is determined that the device conflict rule read out of the device conflict rule DB 605 does not include any combination pattern of the print setting read out of the print job, the processing proceeds to step S1304. When the processing proceeds to step S1304, the spooler 608 executes the retained print job. The spooler 608 transmits the print job to the network printer 105 via the data transmission/reception management unit 609. Then, the spooler 608 receives a processing status from the network printer 105 via the data transmission/reception management unit 609. As apparent from the above description, in the present exemplary embodiment, a transmission unit and the acquisition unit can be realized by the processing to be performed at least in step S1304.

In step S1305, the device conflict processing unit 603 performs device status analysis processing for analyzing the processing status received from the network printer 105 that has executed the print job. Processing to be performed in step S1305 is similar to the processing performed in step S705 of FIG. 7 described in the first exemplary embodiment and is not described below in detail.

In step S1306, the device conflict processing unit 603 determines whether there is any device conflict based on the processing result of step S1305. If the device conflict processing unit 603 determines that there is a device conflict (YES in step S1306), the processing proceeds to step S1307 and otherwise terminates the routine of the flowchart illustrated in FIG. 14. Processing to be performed in step S1307 is similar to the processing illustrated in FIG. 12 (step S706 in FIG. 7) of the first exemplary embodiment and is not described below in detail. In the present exemplary embodiment, a test unit can be realized by the processing to be performed at least in step S1307.

As apparent from the above description, in the present exemplary embodiment, the print server 101 registers a print setting having caused a conflict (device conflict), as a device conflict rule, in the device conflict rule DB 605. Accordingly, an application operating on the client computer 102 needs not perform any conflict processing. The conflict processing is highly dependent on each machine model and may cause troubles when introduced. However, the present exemplary embodiment can solve the problem as described above and enables any application, which could not execute the conflict processing, to easily perform the conflict processing. Therefore, user's operability can be greatly improved.

Next, a third exemplary embodiment of the present invention is described below. According to the above-described exemplary embodiment, the CPU 200 performs print setting processing again if there is any device conflict. In the present exemplary embodiment, an alternate setting unit refers to a print result if there is any device conflict, and solves the conflict by selecting a print setting similar to the print setting having caused the device conflict. In this manner, the present exemplary embodiment is different from the above-described first exemplary embodiment mainly in the processing performed when there is any device conflict. Accordingly, the following description of the present exemplary embodiment does not include any detailed description with respect to constituent components and portions similar to those described in the above-described first exemplary embodiment. More specifically, the present exemplary embodiment uses the basic processing flowchart illustrated in FIG. 7 described in the first exemplary embodiment. In the present exemplary embodiment, the processing illustrated is FIG. 8 (details of the step S701 of FIG. 7) is replaced by processing illustrated in FIG. 15.

Figure 15:
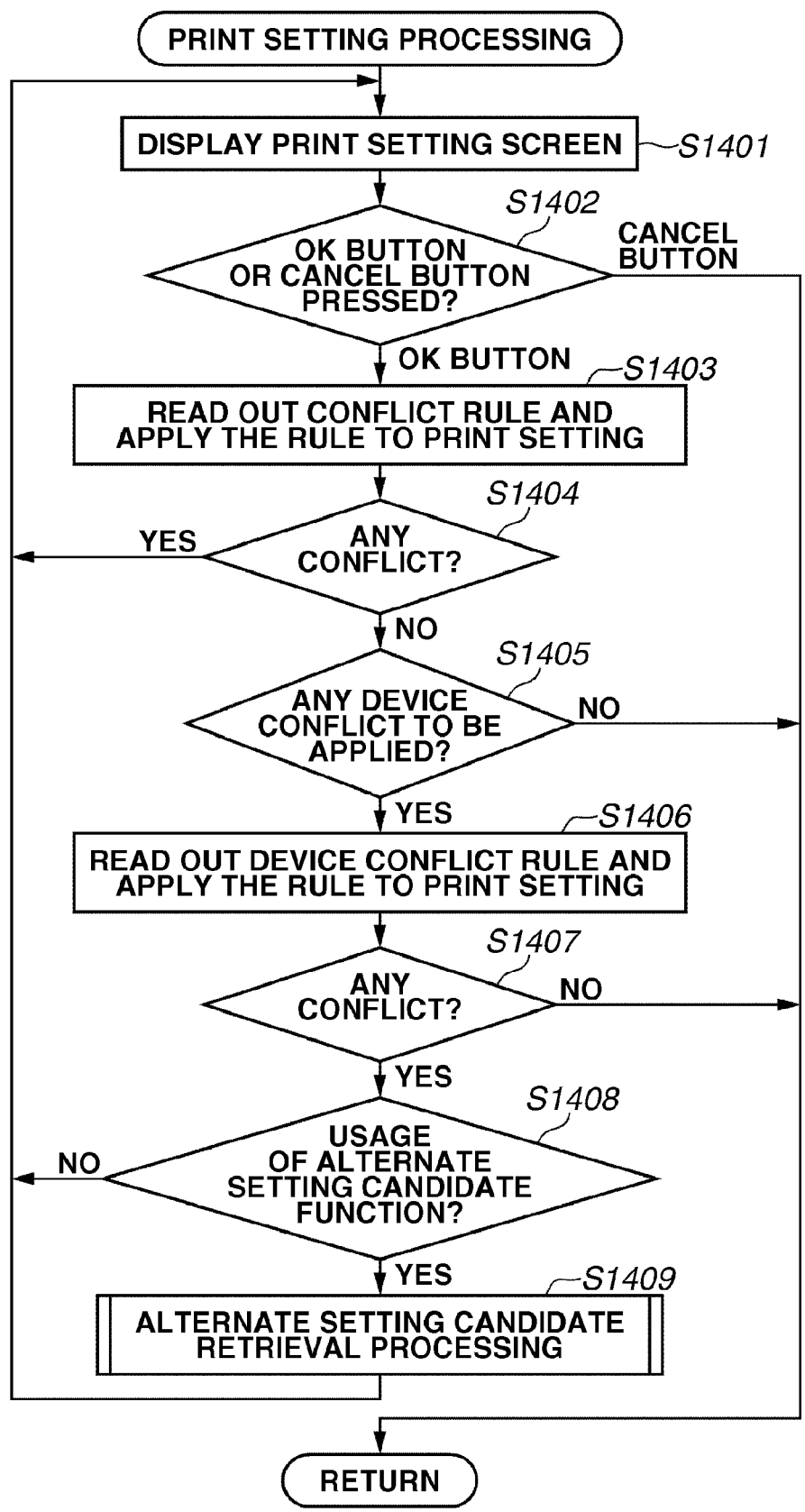
FIG. 15 is a flowchart illustrating detailed print setting processing to be performed in step S701 according to a third exemplary embodiment of the present invention.

FIG. 15 is a flowchart illustrating detailed print setting processing to be performed in step S701. In step S1401, the print setting unit 601 displays the print setting screen (GUI) on the display device 207. In the present exemplary embodiment, the print setting screen enables a user to perform an alternate candidate display mode setting in addition to print setting. The alternate candidate display mode setting includes determining whether to use an alternate setting candidate display function and displaying an alternate setting candidate.

For example, when the alternate setting candidate is displayed, the user can select the display mode between an outcome priority mode and a setting priority mode. When the outcome priority mode is selected, an alternate setting candidate is highly ranked in display processing, if it can increase the possibility to obtain the same outcome. When the setting priority mode is selected, an alternate setting candidate is highly ranked in display processing, if it has a large number of setting items. Similar to the first exemplary embodiment, a user can use the print setting screen to determine whether to apply the device conflict and register a level (mode) to be used to detect the presence of any conflict when the device conflict is applied.

In step S1402, the print setting unit 601 determines whether the user has pressed the OK button or the cancel button on the print setting screen. If the print setting unit 601 determines that the OK button is pressed, the processing proceeds to step S1403. If the cancel button is pressed, the CPU 200 terminates the routine of the flowchart illustrated in FIG. 15 and proceeds to step S702 of FIG. 7.

When the processing proceeds to step S1403, the conflict processing unit 604 reads out the conflict rule from the conflict rule DB 606 and applies the conflict rule to the print setting performed in step S1401. As described above, the conflict rule is registered beforehand in the conflict rule DB 606 (system).

In step S1404, the conflict processing unit 604 determines whether the readout conflict rule includes any combination pattern of the print setting performed in step S1401. If the conflict processing unit 604 determines that the readout conflict rule includes the combination pattern of the print setting performed in step S1401 (YES in step S1404), the processing returns to step S1401 because of the presence of the conflict.

If the conflict processing unit 604 determines that the readout conflict rule does not include any combination pattern of the print setting performed in step S1401 (NO in step S1404), the processing proceeds to step S1405. When the processing proceeds to step S1405, the device conflict processing unit 603 determines whether application of the device conflict is selected in step S1401. If the device conflict processing unit 603 determines that the application of the device conflict is selected (YES in step S1405), the processing proceeds to step S1406.

If the device conflict processing unit 603 determines that the application of the device conflict is not selected (NO in step S1405), the CPU 200 terminates the routine of the flowchart illustrated in FIG. 15 and proceeds to step S702 of FIG. 7. As apparent from the above description, in the present exemplary embodiment, the third determination unit can be realized by the processing to be performed at least in step S1405.

When the processing proceeds to step S1406, the device conflict processing unit 603 reads out the device conflict rule stored in the device conflict rule DB 605 and applies the device conflict rule to the print setting performed in step S1401. The device conflict rule stored in the device conflict rule DB 605 is the conflict rule extracted from the print execution result, which is not present in the initial state of the system.

In step S1407, the device conflict processing unit 603 determines whether the readout device conflict rule includes any combination pattern of the print setting performed in step S1401. If the device conflict processing unit 603 determines that the readout device conflict rule includes the combination pattern of the print setting performed in step S1401 (YES in step S1407), the processing proceeds to step S1408 because of the presence of the conflict and otherwise proceeds to step S702 of FIG. 7 while terminating the routine of the flowchart illustrated in FIG. 15. As apparent from the above description, in the present exemplary embodiment, the second determination unit can be realized by the processing to be performed at least in step S1407.

When the processing proceeds to step S1408, the device conflict processing unit 603 determines whether to use the alternate setting candidate function based on the setting performed using the print setting screen in step S1401. If the device conflict processing unit 603 determines that the alternate setting candidate function is used (YES in step S1408), the processing proceeds to step S1409 and otherwise proceeds to step S1401.

When the processing proceeds to step S1409, the conflict processing unit 604 performs alternate setting candidate retrieval processing for retrieving an alternate setting candidate. After the alternate setting candidate retrieval processing is completed, the processing returns to step S1401, in which the print setting content of the alternate setting candidate is displayed on the print setting screen. The alternate setting candidate can be displayed as part of a conflict warning message or can be displayed as one of setting items.

Figure 16:
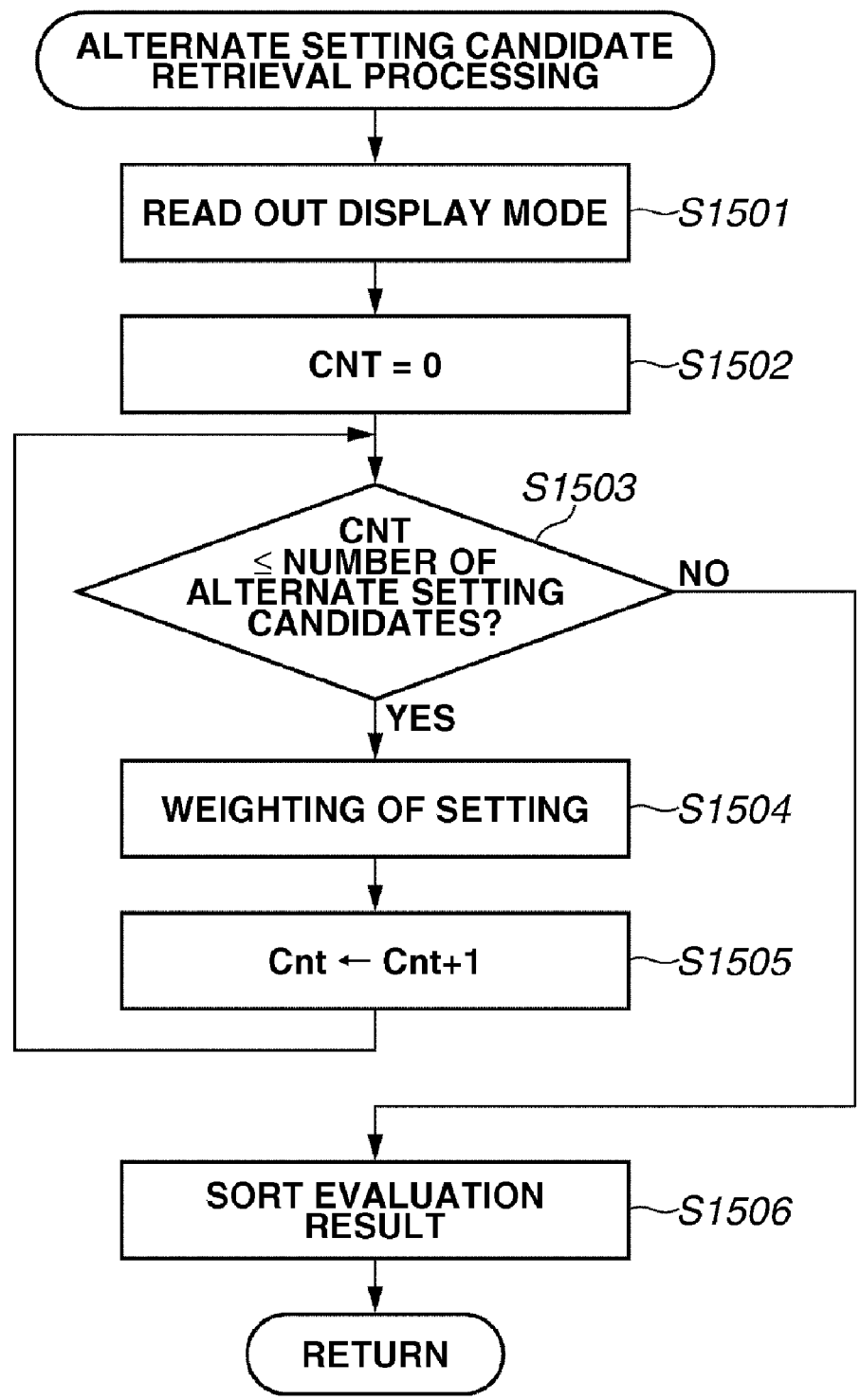
FIG. 16 is a flowchart illustrating detailed alternate setting candidate retrieval processing to be performed in step S1409 illustrated in FIG. 15.

FIG. 16 is a flowchart illustrating detailed alternate setting candidate retrieval processing to be performed in step S1409. In step S1501, the conflict processing unit 604 reads out a display mode selected in step S1401. In step S1502, the conflict processing unit 604 initializes the counter (CNT) to zero. In step S1503, the conflict processing unit 604 extracts print settings having ever been executed by the corresponding network device as alternate setting candidates from the print history DB 622. Then, the conflict processing unit 604 determines whether the counter value is equal to or less than the number of extracted print settings (alternate setting candidates).

If the conflict processing unit 604 determines that the counter value is greater than the number of the extracted print settings (alternate setting candidates) (NO in step S1503), the processing proceeds to step S1506. As apparent from the above description, in the present exemplary embodiment, a retrieval unit can be realized by the processing to be performing at least in step S1503. In the present exemplary embodiment, the second storage unit can be realized by the processing to be performed at least in step S906 described in the first exemplary embodiment.

If the conflict processing unit 604 determines that the counter value is equal to or less than the number of the extracted print settings (alternate setting candidates) (YES in step S1503), the processing proceeds to step S1504. When the processing proceeds to step S1504, the conflict processing unit 604 performs weighting for the extracted print settings. In the present exemplary embodiment, the conflict processing unit 604 differentiates a weighting factor applied to the match in print setting according to the display mode read in step S1501.

It is now assumed that the selected display mode is the outcome priority mode. According to the outcome priority mode, if the outcome obtained by a user is identical, a lower priority level is allocated to the setting items (e.g., discharge destination and discharged sheet surface) of an output product. In this case, a higher evaluation point is given to an alternate setting candidate (print setting) if any matched finishing setting influences the outcome. A lower evaluation point is given to an alternate setting candidate (print setting) if it does not influence the outcome.

More specifically, the following evaluation points are given to respective setting items.
matching in sheet size: 1000
matching in finishing: 1000
matching in discharge destination: 10

If the print setting performed in step S1401 is "device A, A4, staple (left top), discharge destination (upper)", the following evaluation points can be given to alternate setting candidates extracted from the print history DB 622.

| | DEVICE | SHEET SIZE | FINISHING | DISCHARGE DESTINATION | EVAL-UATION POINT |
|---|---|---|---|---|---|
| 1 | DEVICE A | A4 | STAPLE (LEFT TOP) | DISCHARGE DESTINATION (CENTER) | 2000 |
| 2 | DEVICE A | A4 | STAPLE (LEFT MIDDLE) | DISCHARGE DESTINATION (UPPER) | 1010 |
| . | | | | | |
| . | | | | | |
| . | | | | | |

As described above, after evaluating the alternate setting candidates (print settings) extracted from the print history DB 622, in step S1505, the conflict processing unit 604 increments the counter. Then, the processing returns to step S1503. If the evaluation for all of the extracted alternate setting candidates is completed, the processing proceeds to step S1506. Then, the conflict processing unit 604 sorts the alternate setting candidates in decreasing order of the evaluation point, allocates a priority level to each alternate setting candidate, and displays the priority-processed alternate setting candidates on the display device 207. A user can refer to the priority-processed alternate setting candidates and select one of the alternate setting candidates. As apparent from the above description, in the present exemplary embodiment, a notification unit can be realized by the processing to be performed at least in step S1506.

As apparent from the above description, if there is a print setting causing a device conflict, the present exemplary embodiment can select an alternate setting candidate as a print setting similar to the print setting having caused the device conflict and can notify a user of the alternate setting candidate. In this case, it is desired to allocate a priority level to each print setting selected as an alternate setting candidate according to user's preference and notify a user of the print setting similar to the print setting having caused the device conflict according to the priority level. As a result, user's operability can be greatly improved. The present exemplary embodiment can be applied to the above-described second exemplary embodiment.

Next, a fourth exemplary embodiment of the present invention will be described. There is a general-purpose print setting format (e.g., JDF, which is a public format of an XML-based job definition file), which enables a user to arbitrarily set print instructions irrespective of those designated by a manufacturing vendor of the printer. The setting using the general-purpose print setting format has a higher degree of freedom. Therefore, even in a case where the same outcome is obtained, a plurality of settings can be selected as a setting notation method.

Therefore, even if the setting is correctly performed as specification to be required for the format, the setting may not be interpreted and the print job may be cancelled depending on the printer manufacturing vendor. Hence, the present exemplary embodiment performs notation check processing with respect to the general-purpose print setting format, to be added to the conflict processing performed to execute the print setting.

In other words, the present exemplary embodiment is different from the above-described first exemplary embodiment in that the notation check processing for the general-purpose print setting format is additionally performed. Accordingly, the following description of the present exemplary embodiment does not include any detailed description with respect to constituent components and portions similar to those described in the above-described first exemplary embodiment.

Figure 17:
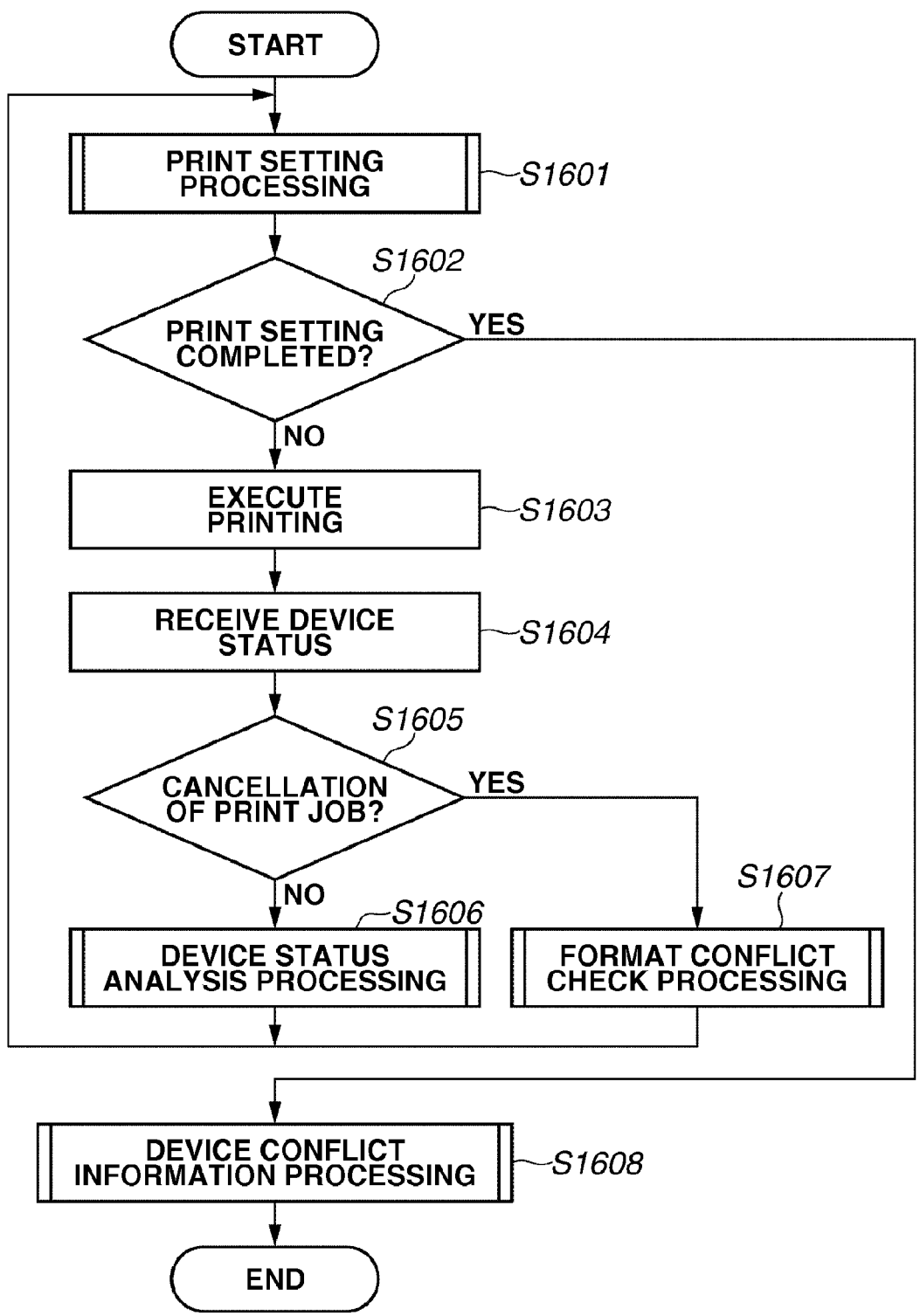
FIG. 17 is a flowchart illustrating an example basic processing flow according to a fourth exemplary embodiment of the present invention.

FIG. 17 is a flowchart illustrating an example basic processing flow according to the present exemplary embodiment. In FIG. 17, processing to be performed in steps S1602 to S1604 and step S1608 is similar to the processing performed in steps S702 to S704 and step S706 of FIG. 7 described in the first exemplary embodiment. Therefore, the following description of the present exemplary embodiment does not include any detailed description with respect to the processing to be performed in steps S1602 to S1604 and step S1608. In the present exemplary embodiment, the acquisition unit can be realized by the processing to be performed at least in step S1604, and the test unit can be realized by the processing to be performed at least in step S1608. The present exemplary embodiment includes newly added processing to be performed in steps S1605 and S1607.

Figure 18:
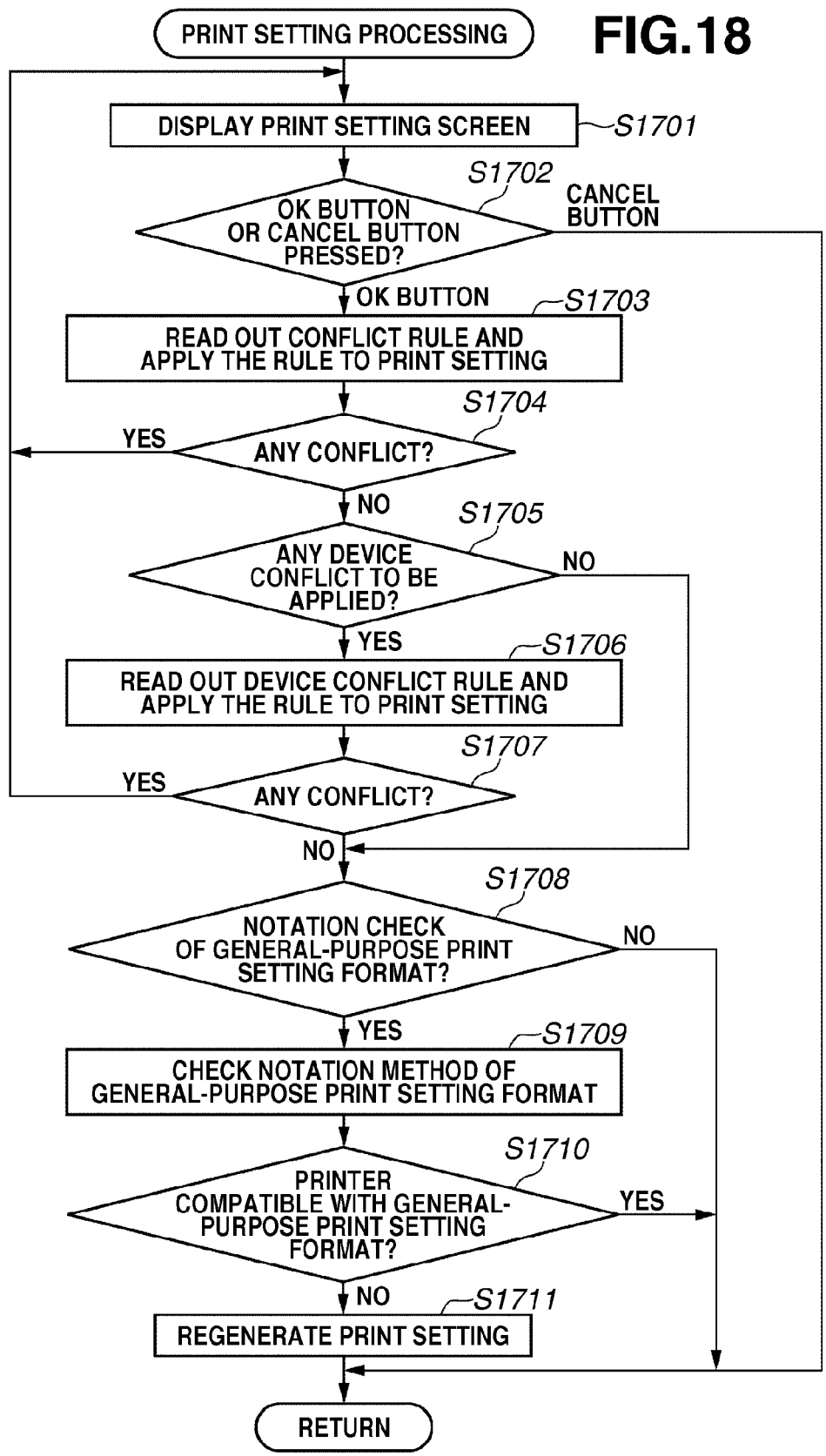
FIG. 18 is a flowchart illustrating detailed print setting processing to be performed in step S1601 illustrated in FIG. 17.

FIG. 18 is a flowchart illustrating detailed print setting processing to be performed in step S1601. Processing to be performed in steps S1701 to S1707 of FIG. 18 is similar to the processing performed in steps S801 to S807 of FIG. 8 described in the first exemplary embodiment. Therefore, the present exemplary embodiment does not include any detailed description with respect to the processing to be performed in steps S1701 to S1707.

However, according to the present exemplary embodiment, a user is allowed to instruct whether to perform the notation check of the general-purpose print setting format using the print setting screen in step S1701. In the present exemplary embodiment, the second determination unit can be realized by the processing to be performed at least in step S1707 and the third determination unit can be realized by the processing to be performed at least in step S1705.

In step S1708, the device conflict processing unit 603 determines whether to perform the notation check of the general-purpose print setting format based on the setting performed in step S1701. If the device conflict processing unit 603 determines that the notation check of the general-purpose print setting format is performed (YES in step S1708), the processing proceeds to step S1709 and otherwise proceeds to step S1602 of FIG. 17 while terminating the routine of the flowchart illustrated in FIG. 18.

When the processing proceeds to step S1709, the device conflict processing unit 603 checks a notation method of the general-purpose print setting format. In step S1709, the device conflict processing unit 603 determines whether the description of the general-purpose print setting format is registered as a description that cannot be processed by the network printer serving as a transmission destination of the print job.

More specifically, as a page number designation method, an absolute page number can be used to designate each page (namely, pages are sequentially numbered from the head page). As another designation method comparable to the above-described designation method, a relative page number can be used to designate each page. When the final page is designated by −1, the page preceding the final page by one (page positioned one page closer to the head page) can be designated by −2.

According to the general-purpose print setting format, a user is allowed to select the page designation between the relative page number and the absolute page number. Accordingly, the user can designate any one of the two designations as the general-purpose print setting to be made by the print setting. However, depending on the machine model of the printer or depending on the development vendor of the printer, one of the two designations may not be processed by the printer. In this case, the printer cancels the processing to be performed based on the print job including the designation that cannot be processed.

In the present exemplary embodiment, it is determined whether there is any designation method for the general-purpose print setting format, which is equivalent to the designation method having caused cancellation of the print job, based on the recording content of a below-described alternate setting rule. If there is an equivalent designation method as described above, the designation method for the general-purpose print setting format is rewritten by the equivalent designation method. Then, a management is performed for each network printer serving as an output destination by reentering the print job based on the general-purpose print setting format whose designation method is rewritten and determining whether the processing has been correctly performed.

In step S1710, the device conflict processing unit 603 determines whether the network printer (an output destination of the print job (processing target)) is compatible with the designated method of the print job based on the check result in step S1709. If the device conflict processing unit 603 determines that the network printer (output destination of the print job (processing target)) is not compatible with the designated method of the print job (NO in step S1710), the processing proceeds to step S1711, and otherwise proceeds to step S1602 of in FIG. 17 while terminating the routine of the flowchart illustrated in FIG. 18. As apparent from the above description, in the present exemplary embodiment, a fourth determination unit can be realized by the processing to be performed at least in step S1711.

The processing of step S1710 can be performed when there is a designation method equivalent to the designation method for the general-purpose print setting format and/or when in step S1606 it is determined that any device conflict is caused. In this case, a fifth determination unit can be realized by the device conflict processing unit 603 that performs confirmation as to whether there is any designation method equivalent to the designation method for general-purpose print setting format.

When the processing proceeds to step S1711, the device conflict processing unit 603 rewrites the designated method for the print job (processing target) with any equivalent designation method acceptable by the network printer serving as an output destination. For example, if in step S1710 the device conflict processing unit 603 determines that the printer (output destination) does not accept the relative page designation whereas the print setting includes the relative page designation, the device conflict processing unit 603 rewrites the print setting in step S1711 so as to include an equivalent absolute page designation. As apparent from the above description, in the present exemplary embodiment, a rewriting unit can be realized by the processing to be performed at least in step S1710.

Referring back to FIG. 17, in step S1605, the device conflict processing unit 603 determines whether the processing status received in step S1604 is cancellation of the print job. If the device conflict processing unit 603 determines that the processing status is the cancellation of the print job (YES in step S1605), the processing proceeds to step S1607. Then, the device conflict processing unit 603 performs format conflict check processing to check the presence of any problem in the designation method for the general-purpose print setting format. If the device conflict processing unit 603 determines that the processing status is not the cancellation of the print job (NO in step S1605), the processing proceeds to step S1606. Processing to be performed in step S1606 is similar to the processing performed in step S705 of FIG. 7 and is not described below in detail. In the present exemplary embodiment, the first determination unit can be realized by the processing to be performed at least in step S1606 (the processing corresponding to steps S901, S903 to S905, S908, S909, and S911).

Figure 19:
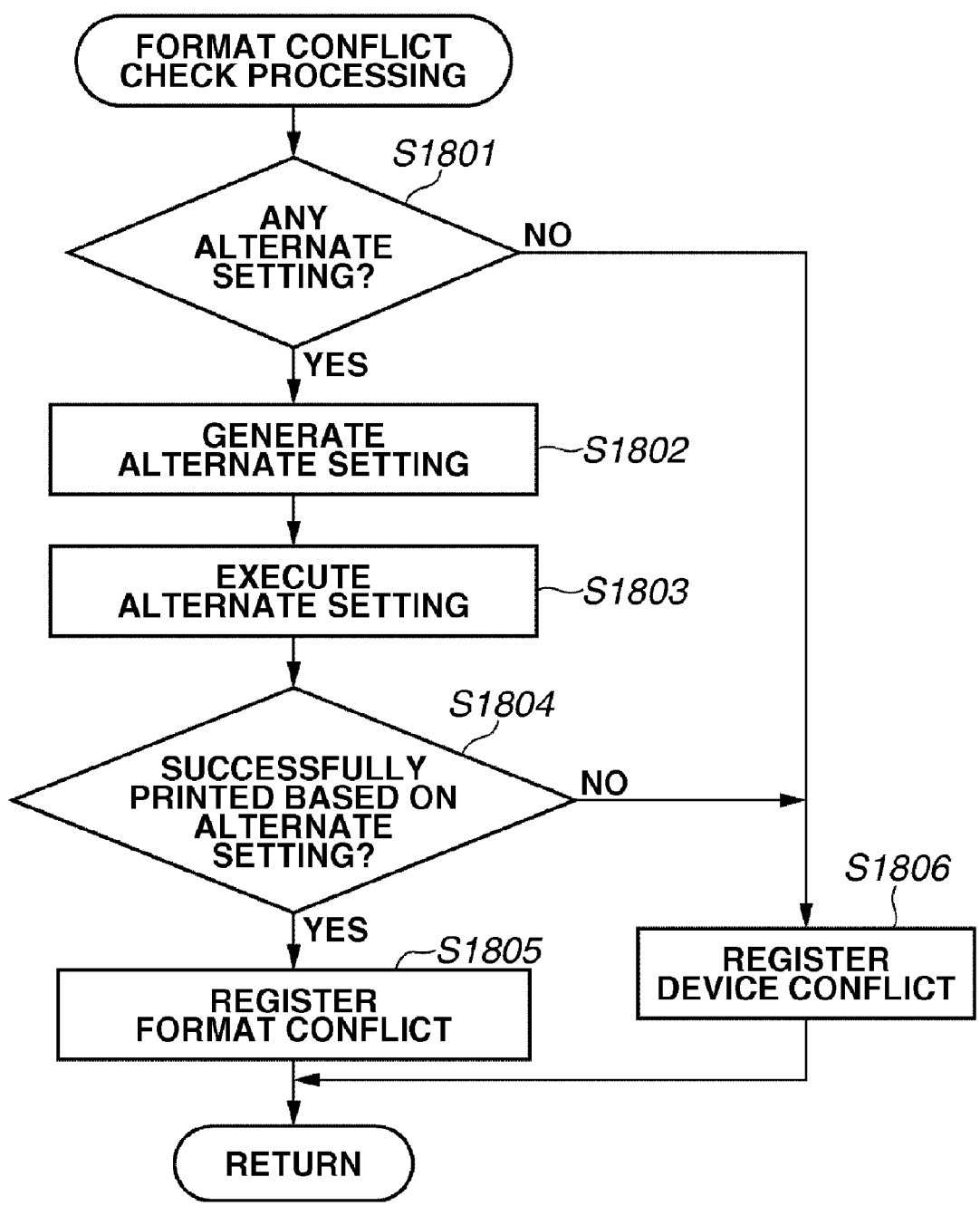
FIG. 19 is a flowchart illustrating detailed format conflict check processing to be performed in step S1607 illustrated in FIG. 17.

FIG. 19 is a flowchart illustrating detailed format conflict check processing to be performed in step S1607. In step S1801, the device conflict processing unit 603 determines whether there is any designation method (alternate setting) equivalent to the designation method for the general-purpose print setting format. In the present exemplary embodiment, combination patterns of the alternate setting (alternate setting rule) are registered beforehand in the system or may be obtained, if necessary, from an external device.

If the device conflict processing unit 603 determines that there is an alternate setting (YES in step S1801), the processing proceeds to step S1802. When the processing proceeds to step S1802, the device conflict processing unit 603 rewrites a concerned portion of the print setting (concerned portion in a described general-purpose print setting format) with the content of the alternate setting. In step S1803, the device conflict processing unit 603 transmits a print job including the print setting rewritten in step S1802 to the network printer via the data transmission/reception management unit 602 and acquires a processing status from the network printer. The processing performed in step S1803 corresponds to the processing performed in steps S703 and S704 of FIG. 7 (steps S1603 and 1604 of FIG. 17) and is not described below in detail in the present exemplary embodiment.

In step S1804, the device conflict processing unit 603 determines whether the print processing according to the alternate setting has been successfully executed based on the processing status acquired in step S1803. If the device conflict processing unit 603 determines that the print processing according to the alternate setting has been successfully executed (YES in step S1804), the processing proceeds to step S1805. When the processing proceeds to step S1805, the device conflict processing unit 603 registers information relating to the printer (information relating to the output destination of the print job) and a print result obtained according to the alternate setting (successful printing, in this case), as a format conflict rule, to the alternate setting rule having been referred to in step S1801. The alternate setting rule can be referred to in the above-described step S1709.

If the device conflict processing unit 603 determines that the print processing according to the alternate setting has not been successfully executed (NO in step S1804), the processing proceeds to step S1806. In step S1806, the device conflict processing unit 603 registers the alternate setting, as a conflict "presence" setting, in the device conflict rule. The processing performed in step S1806 is similar to the processing performed in step S705 of FIG. 7 (step S1606 in FIG. 17) and is not described below in the present exemplary embodiment. In the present exemplary embodiment, the first storage unit can be realized by the processing to be performed at least in step S1606 (processing corresponding to step S910) and step S1806.

As apparent from the above description, if there is any designation method equivalent to the "designation method for the general-purpose print setting format" in the print setting having caused cancellation of the print job, the present exemplary embodiment rewrites the designation method for the general-purpose print setting format with the equivalent designation method and then reenters the print job based on the general-purpose print setting format including the rewritten designation method. Accordingly, even if the setting method for the general-purpose print setting format is different depending on a machine model of the printer or depending on the development vendor of the printer, the present exemplary embodiment can change the setting if there is any alternate setting and can perform printing based on the alternate setting. As a result, user's operability can be greatly improved. The present exemplary embodiment can be applied to any one of the above-described second and third exemplary embodiments.

Next, a fifth exemplary embodiment of the present invention is described below. The method used in the above-described first exemplary embodiment includes registration of the device conflict based on a print result. However, if the registration of the device conflict is dependent on a print result, each printer serving as an output destination of a print job (or a printer of the same machine model) is required to perform print processing at least one time.

Hence, in the present exemplary embodiment, a plurality of printers (e.g., printers of a plurality of machine models, or printers of a plurality of printer vendors) perform the same print jobs identical in print setting. If any device conflict of the print setting occurs in two or more printers, the present exemplary embodiment registers the caused device conflict as a device conflict rule and applies the registered device conflict rule to any other printer having no print result. In this manner, the present exemplary embodiment is different from the above-described first exemplary embodiment in the registration method of the device conflict rule and part of its application method. Accordingly, the following description of the present exemplary embodiment does not include any detailed description with respect to constituent components and portions similar to those described in the above-described first exemplary embodiment. In the following description, the print setting having causes the device conflict in a plurality of printers can be referred to as a device common conflict rule, if necessary, to discriminate it from the device conflict rule in the preceding description.

Figure 20:
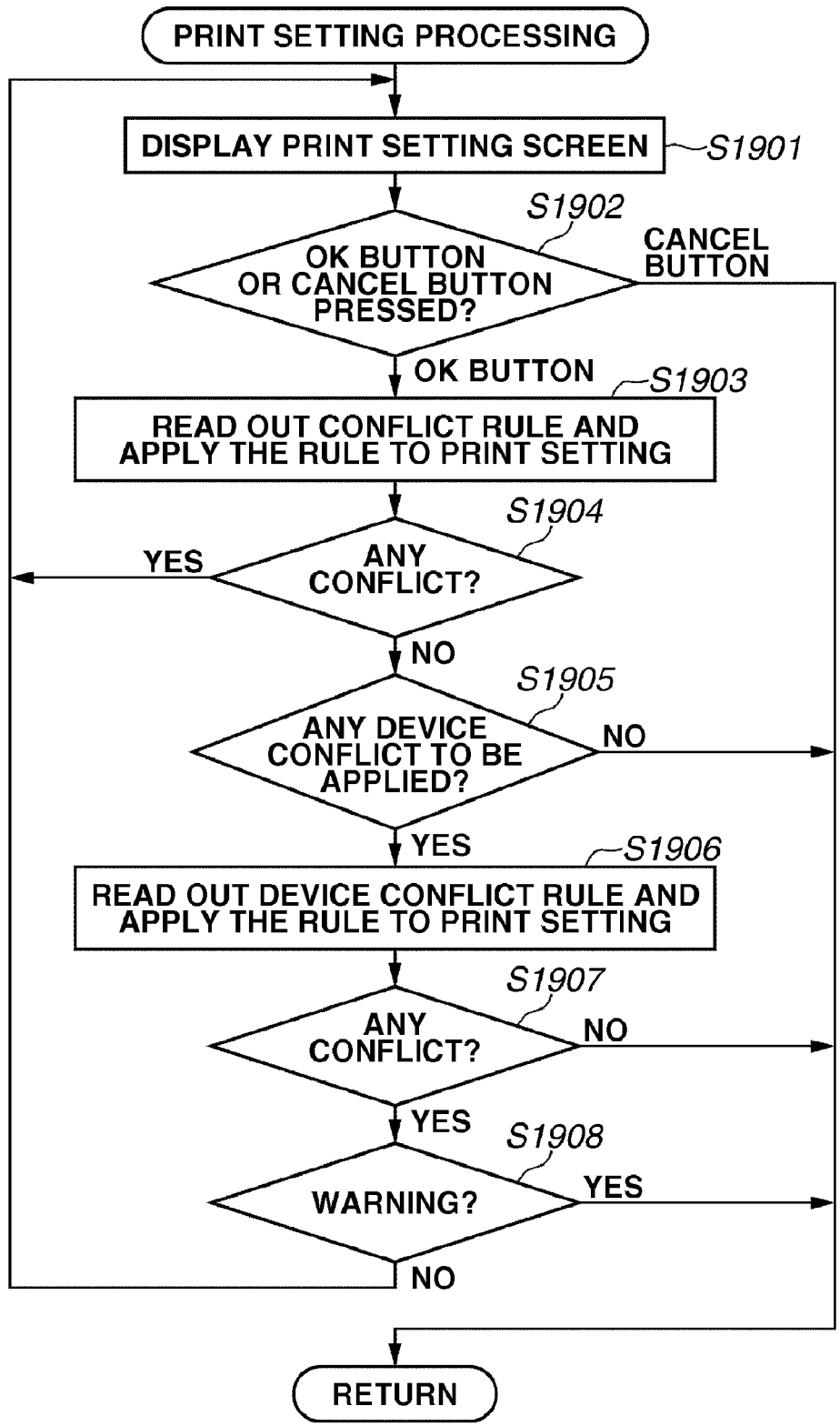
FIG. 20 is a flowchart illustrating detailed print setting processing to be performed in step S701 according to a fifth exemplary embodiment of the present invention.
Figure 21:
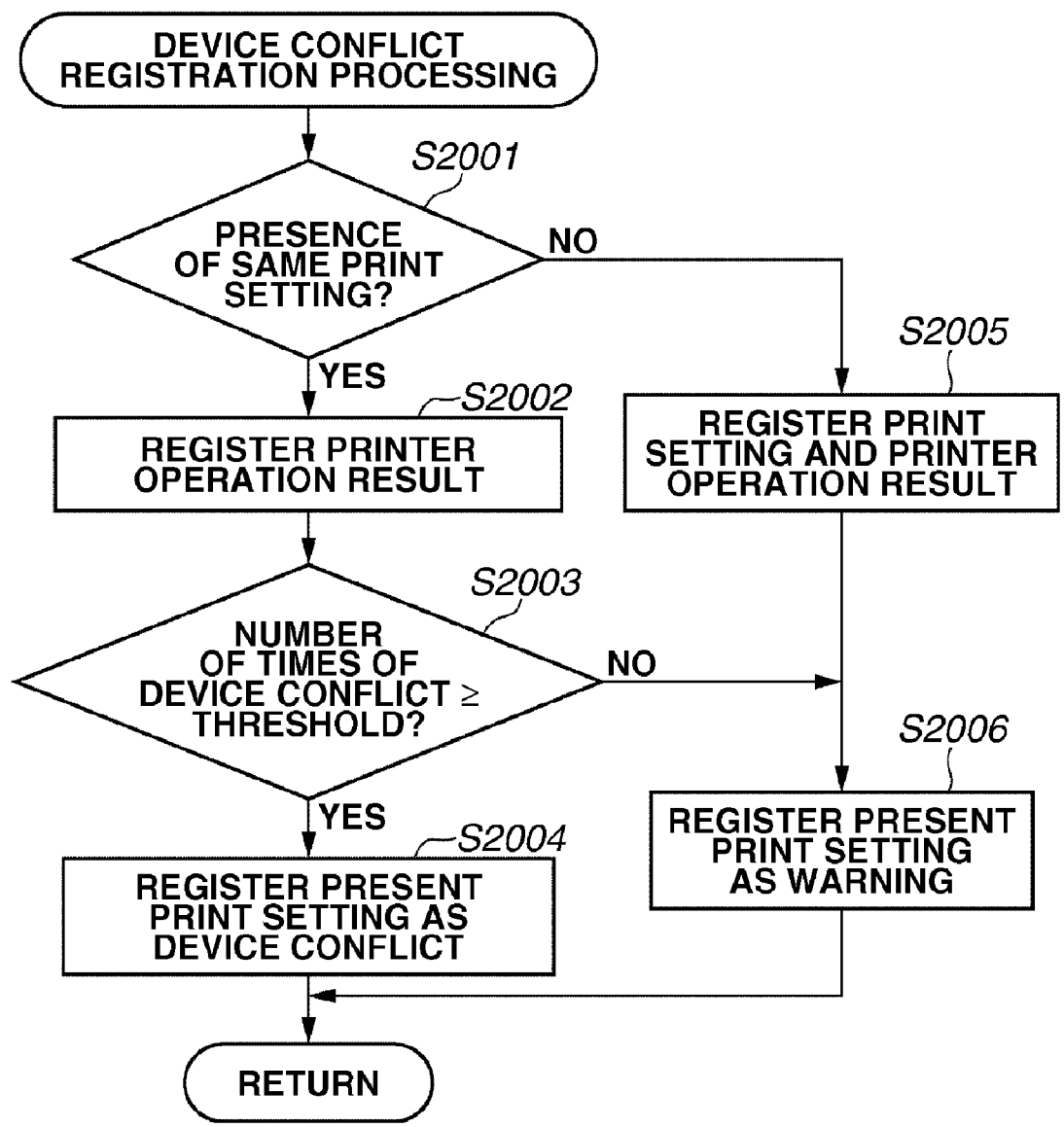
FIG. 21 is a flowchart illustrating detailed "device conflict registration processing" according to the fifth exemplary embodiment of the present invention, which can be executed instead of step S910 of FIG. 10.
Figure 23:
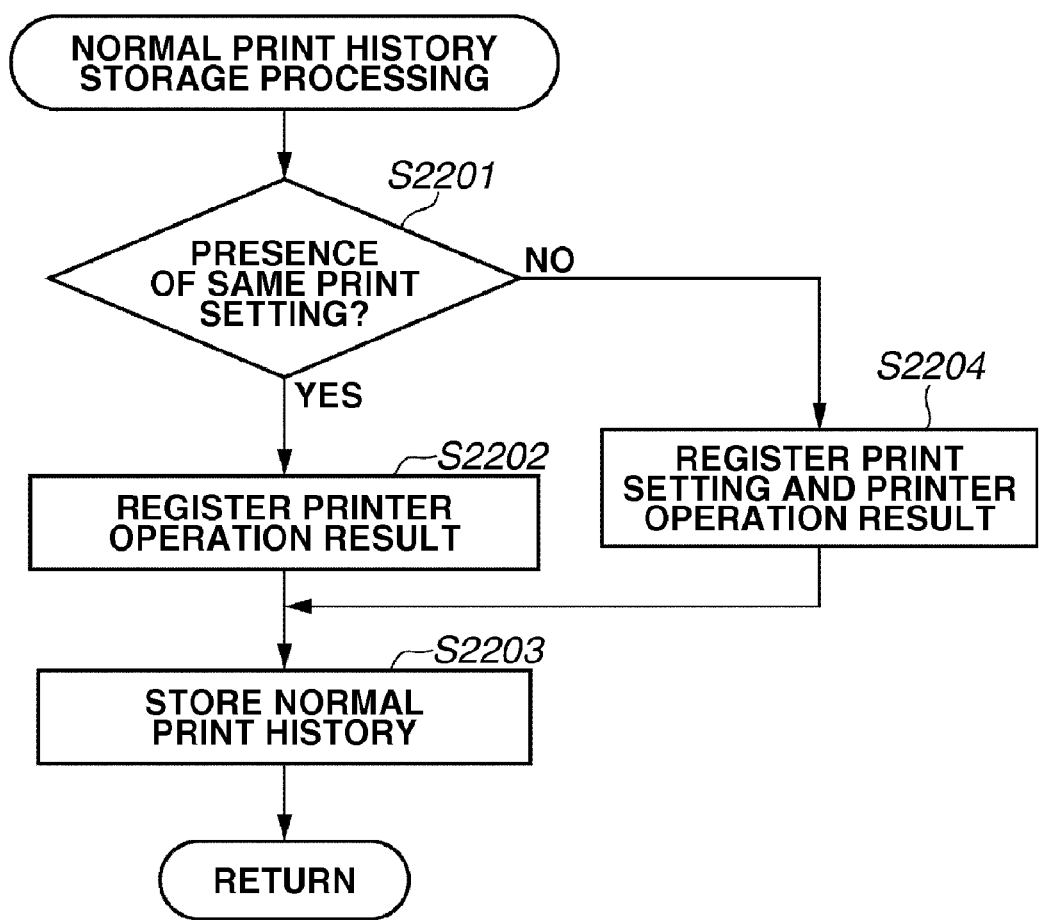
FIG. 23 is a flowchart illustrating "normal print history storing processing" according to the fifth exemplary embodiment of the present invention, which can be executed instead of step S906 of FIG. 10.

In the present exemplary embodiment, for example, step S701 of FIG. 7 described in the first exemplary embodiment can be replaced by FIG. 20, step S910 of FIG. 10 can be replaced by FIG. 21, and step S906 of FIG. 10 can be replaced by FIG. 23. The basic processing flow of the present exemplary embodiment is described in the flowchart illustrated in FIG. 7 and is not described below.

FIG. 20 is a flowchart illustrating detailed print setting processing to be performed in step S701. The flowchart illustrated in FIG. 20 is based on the flowchart illustrated in FIG. 8 and is different in steps S1906, S1907, and S1908. Processing to be performed in steps S1901 to S1905 corresponds to the processing performed in steps S801 to S805. In the present exemplary embodiment, the third determination unit can be realized by the processing to be performed at least in step S1905.

When the processing proceeds to step S1906, the device conflict processing unit 603 reads out the device conflict rule from the device conflict rule DB 605 and applies the conflict rule to the print setting performed in step S1901. The device conflict rule is the conflict rule registered based on the print result. However, if the print setting performed in step S1901 is registered as the device common conflict rule, the device conflict processing unit 603 applies the device conflict rule even if the print printing is performed by the network printer having no print result. In this case, application of the device common conflict rule can be determined based on the occurrence frequency of the print setting performed in step S1901. For example, if the occurrence frequency of the print setting is low, a warning message of the device common conflict rule may be displayed.

In step S1907, the device conflict processing unit 603 determines whether the print setting performed in step S1901 is included in the device common conflict rule. If the device conflict processing unit 603 determines that the print setting performed in step S1901 is included in the device common conflict rule (YES in step S1907), the processing proceeds to step S1908 and otherwise proceeds to step S702 of FIG. 7 because of the absence of conflict while terminating the processing of the flowchart illustrated in FIG. 20. As apparent from the above description, in the present exemplary embodiment, the second determination unit can be realized by the processing to be performed at least in step S1907.

When the processing proceeds to step S1908, the conflict processing unit 604 determines whether the occurrence frequency of a device common conflict is lower than a predetermined threshold. If the conflict processing unit 604 determines that the occurrence frequency of the device common conflict is equal to or higher than the predetermined threshold (NO in step S1908), the processing returns to step S1901. If the conflict processing unit 604 determines that the occurrence frequency of the device common conflict is lower than the predetermined threshold (YES in step S1908), the CPU 200 causes the display unit to display a warning message and terminates the routine of the flowchart illustrated in FIG. 20 and, then, proceeds to step S702 to perform print processing. In this case, the CPU 200 may allow a user to determine processing to be executed next after confirming the displayed warning message.

FIG. 22 illustrates an example content stored in the device conflict rule DB 605, which can be used in the present exemplary embodiment. In FIG. 22, "o" indicates that there is no device conflict (the print setting performed in step S1901 is not included in the device conflict rule), and "x" indicates that there is a device conflict (the print setting performed in step S1901 is included in the device conflict rule). The blank field indicates that print processing is not yet performed.

In FIG. 22, a print setting C has caused the device conflict a plurality of times (which is greater than a threshold (e.g., 3)) in a plurality of printers and therefore is registered as a device common conflict rule. A print setting D has caused the device conflict in a plurality of printers. However, the frequency of occurrence was lower than the threshold. Therefore, the CPU 200 performs the warning display. The threshold can be registered by a user using the print setting screen (GUI) displayed in step S1901 or can be registered beforehand in the system.

In the above-described step S1907, the conflict processing unit 604 determines whether the print setting performed in step S1901 is registered as having caused the device conflict in the device conflict rule DB 605 illustrated in FIG. 22. If the conflict processing unit 604 determines that the device common conflict is "absent", the processing proceeds to step S702. If the conflict processing unit 604 determines that the device common conflict is "present", the processing proceeds to step S1908.

In step S1908, the conflict processing unit 604 determines a device common conflict level referring to the device conflict rule DB 605 illustrated in FIG. 22. If the determination result indicated in a device common conflict determination field is "warning", the CPU 200 causes the display unit to display a warning message and proceeds to step S702. If the determination result indicated in the device common conflict determination field is "none", the processing directly proceeds to step S702. If the determination result indicated in the device common conflict determination field is "registration", the processing returns to step S701 because of the presence of the conflict. If in step S1908 the determination result is "warning", the CPU 200 may cause the display unit to display a print execution button and a cancel button together with the warning message to allow a user to determine execution of the print processing.

FIG. 21 is a flowchart illustrating detailed "device conflict registration processing", which can be executed instead of step S910 of FIG. 10. In step S2001, the device conflict processing unit 603 determines whether the device conflict rule includes the present print setting. If the device conflict processing unit 603 determines that the device conflict rule includes the present print setting (YES in step S2001), the processing proceeds to step S2002 and otherwise proceeds to step S2005.

When the processing proceeds to step S2002, namely when the present print setting is already included in the device conflict rule, the device conflict processing unit 603 registers the presence of the conflict to the network printer serving as the present output destination of the print job. In the example illustrated in FIG. 22, if the network printer serving as the present output destination of the print job is the printer B and the present print setting is the print setting D, the device conflict processing unit 603 registers "x" indicating the presence of the device conflict in the field of the print setting D corresponding to the printer B.

Then, in step S2003, the device conflict processing unit 603 determines whether the number of occurrence times of the device conflict is equal to or greater than a predetermined threshold. If the device conflict processing unit 603 determines that the number of occurrence times of the device conflict is equal to or greater than the predetermined threshold (YES in step S2003), the processing proceeds to step S2004 and otherwise proceeds to step S2006. In the present exemplary embodiment, the device conflict processing unit 603 constantly counts the number of occurrence times of the device conflict for each print setting.

When the processing proceeds to step S2004, the device conflict processing unit 603 registers the present print setting, as a device common conflict rule, in the device conflict rule DB 605. More specifically, in step S2002, if "x" indicating the presence of the device conflict is registered in the field of the print setting D corresponding to the printer B, the number of occurrence times of the device conflict with respect to the print setting D is 3.

In this case, if the threshold is 3, the print setting D is determined as a device common conflict rule in step S2003 and the determination "registration" is written in the device common conflict determination field of the device conflict rule DB 605. As apparent from the above description, in the present exemplary embodiment, the first storage unit can be realized by the processing to be performed at least in step S2004. In the present exemplary embodiment, conflict information can be realized by the device common conflict rule stored in the device conflict rule DB 605.

If the device conflict processing unit 603 determines that the number of occurrence times of the device conflict is less than the predetermined threshold (NO in step S2003), the processing proceeds to step S2006. In step S2006, the device conflict processing unit 603 registers the present print setting as a warning in the device conflict rule DB 605. More specifically, in step S2002, if "x" indicating the presence of the device conflict is registered in the field of the print setting A corresponding to the printer D, the number of occurrence times of the device conflict with respect to the print setting A is 1. In this case, if the threshold is 3, the print setting A is determined as a warning in step S2003 and the determination result "warning" is written in the device common conflict determination field of the device conflict rule DB 605.

As described previously, if the device conflict processing unit 603 determines that the device conflict rule does not include the present print setting (NO in step S2001), the processing proceeds to step S2005. When the processing proceeds to step S2005, the device conflict processing unit 603 registers the present print setting and the result as to whether the device conflict has been caused by the print setting ("o" or "x" illustrated in FIG. 22) in the device conflict rule DB 605. Then, the processing proceeds to step S2006, in which the device conflict processing unit 603 registers the "warning" in the device common conflict determination field corresponding to the present print setting.

FIG. 23 is a flowchart illustrating "normal print history storing processing", which can be executed instead of step S906 of FIG. 10. In step S2201, the device conflict processing unit 603 determines whether the present print setting is present (registered) in the device conflict rule DB 605. If the device conflict processing unit 603 determines that the present print setting is present in the device conflict rule DB 605 (YES in step S2201), the processing proceeds to step S2202 and otherwise proceeds to step S2204.

When the processing proceeds to step S2202, the device conflict processing unit 603 registers conflict "absence" to the network printer serving as a present output destination of the print job. In step S2203, recognizing the print processing as having been correctly executed, the device conflict processing unit 603 registers the print setting and print job content information (e.g., total number of content pages) in the print history DB 622.

If the device conflict processing unit 603 determines that the present print setting is not present in the device conflict rule DB 605 (NO in step S2201), the processing proceeds to step S2004. In step S2004, the device conflict processing unit 603 registers the present print setting and the result that no device conflict has been caused by the print setting ("o" illustrated in FIG. 22) in the device conflict rule DB 605. Then, the processing proceeds to step S2203, in which the device conflict processing unit 603 registers the print setting and the print job content information (e.g., total number of content pages) in the print history DB 622.

As apparent from the above description, the present exemplary embodiment registers the device common conflict rule, which is a device conflict rule common to a plurality of printers, and applies a setting included in the registered device common conflict rule to a printer that has no print result. Accordingly, the device conflict rule can be applied to any printer having no print result and user's operability can be greatly improved. The present exemplary embodiment can be applied to any one of the above-described second to fourth exemplary embodiments.

A computer program stored in a RAM or a ROM, when executed by a computer, can realize the functional units configuring the information processing apparatus and steps of the print setting control method according to the above-described exemplary embodiments of the present invention. The present invention encompasses the computer program and a computer-readable storage medium storing the program.

For example, the present invention can be embodied as a system, an apparatus, a method, a program, or a storage medium. More specifically, the present invention can be applied to a system including a plurality of devices and can be applied to an apparatus including a single device.

The present invention includes the following cases. More specifically, any software program capable of realizing the functions of the above-described exemplary embodiments (e.g., programs corresponding to the flowcharts illustrated in FIG. 7, FIG. 8, FIG. 10, FIG. 12, FIGS. 14 to 21, and FIG. 23) can be supplied directly, or from a remote place, to a system or an apparatus. The present invention can be realized by a computer of the system or the apparatus that reads and executes the supplied program code.

Accordingly, the program code installed on the computer to enable the computer to realize functional processing according to the exemplary embodiments of the present invention can realize the present invention. Thus, the present invention encompasses the computer program itself that can realize the functional processing according to the exemplary embodiments of the present invention.

In this case, the type of the program can be any one of object code, interpreter program, and OS script data as far as the program has the required function.

A storage medium supplying the program can be, for example, a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, or a DVD (DVD-ROM, DVD-R).

The method for supplying the program includes accessing a web site on the Internet using a browsing function of a client computer, when the web site allows each user to download the computer program of the present invention, or compressed files of the programs having automatic installing functions, to a hard disk or other storage medium of the user.

The program code constituting the programs according to the exemplary embodiments of the present invention is dividable into a plurality of files so that respective files can be downloaded from different web sites. Namely, the present invention encompasses World Wide Web (WWW) servers that allow numerous users to download the program files so that their computers can perform the functional processing according to the exemplary embodiments of the present invention.

The programs according to the exemplary embodiment of the present invention can be enciphered and recorded on a CD-ROM or comparable storage medium when the programs according to the exemplary embodiment of the present invention are distributable to the users. Authorized users (i.e., users satisfying predetermined conditions) are allowed to download key information from a web page on the Internet. The users can decipher the programs with the obtained key information and can install the programs on their computers.

When the computer reads and executes the installed programs, the computer can realize the functions of the above-described exemplary embodiments. The functions of the above-described exemplary embodiment can be realized by an operating system (OS) or other application software running on a computer, which can execute part or all of actual processing based on instructions of the programs.

Additionally, the program (or code) read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-001593 filed Jan. 8, 2008, which is hereby incorporated by reference herein in its entirety.

What is claimed is:

1. An information processing apparatus comprising:
    an acquisition unit configured to acquire an processing status of a print job from a printing apparatus;
    a first determination unit configured to determine whether processing corresponding to a print setting of the print job has been executed by the printing apparatus, based on the processing status of the print job acquired by the acquisition unit;
    a first storage unit configured to store conflict information in a storage medium if the first determination unit determines that the processing corresponding to the print setting of the print job has not been executed, to prohibit the print setting from being applied to at least the printing apparatus; and
    a second determination unit configured to determine based on the conflict information whether processing corresponding to a print setting of a print job to be executed according to an instruction of a user can be executed by a printing apparatus serving as an output destination of the print job.

2. The information processing apparatus according to claim 1, further comprising:
    a third determination unit configured to determine whether to execute determination to be performed by the second determination unit based on information registered beforehand by the user,
    wherein if the third determination unit determines the determination to be performed by the second determination unit, the second determination unit is configured to determine whether the processing corresponding to the print setting of the print job to be executed according to the instruction of the user can be executed by the printing apparatus serving as the output destination of the print job.

3. The information processing apparatus according to claim 1, further comprising:
a second storage unit configured to reserve the print setting in a storage medium if the first determination unit determines that the processing corresponding to the print setting of the print job has been executed by the printing apparatus;
a retrieval unit configured to retrieve a print setting replaceable with the print setting from the second storage unit, if the second determination unit determines that the processing corresponding to the print setting of the print job cannot be executed by the printing apparatus serving as the output destination of the print job; and a notification unit configured to notify the user of the print setting retrieved by the retrieval unit.

4. The information processing apparatus according to claim 1, further comprising:
a third determination unit configured to determine, if the print setting of the print job is described according to a general-purpose print setting format, whether a content of the general-purpose print setting format can be processed by the printing apparatus serving as the output destination of the print job; and
a rewriting unit configured to rewrite, if the third determination unit determines that the content of the general-purpose print setting format cannot be processed by the printing apparatus serving as the output destination of the print job, at least part of the content that cannot be processed by the printing apparatus serving as the output destination of the print job into a content that can be processed by the printing apparatus serving as the output destination of the print job.

5. The information processing apparatus according to claim 4, further comprising:
a fourth determination unit configured to determine whether there is an alternate setting replaceable with the content of the general-purpose print setting format,
wherein the third determination unit is configured to determine, if the fourth determination unit determines that there is the alternate setting replaceable with the content of the general-purpose print setting format, whether the content of the general-purpose print setting format can be processed by the printing apparatus serving as the output destination of the print job.

6. The information processing apparatus according to claim 4, wherein if the first determination unit determines that the processing corresponding to the print setting of the print job has not been executed by the printing apparatus, the third determination unit determines whether the content of the general-purpose print setting format can be processed by the printing apparatus serving as the output destination of the print job.

7. The information processing apparatus according to claim 1, wherein the first storage unit is configured to store conflict information if the first determination unit determines that the processing corresponding to the print setting of the print job has not been executed by a plurality of printing apparatuses, to prohibit the print setting from being applied to any of the plurality of printing apparatus having no print result according to the print setting.

8. The information processing apparatus according to claim 7, wherein if a number of times of determination by the first determination unit, which has determined that the processing corresponding to the print setting has not been executed, is equal to or greater than a threshold, the first storage unit is configured to store the conflict information to prohibit the print setting from being applied to the any of the plurality of printing apparatus having no print result according to the print setting.

9. The information processing apparatus according to claim 1, further comprising:
a reception unit configured to receive a print job from an external client apparatus; and
a transmission unit configured to transmit the print job received by the reception unit to the printing apparatus.

10. The information processing apparatus according to claim 1, further comprising:
a test unit configured to perform a test to check whether a printing apparatus different from the printing apparatus can execute the print job successfully according to the print setting of the print job.

11. A method comprising:
acquiring an processing status of a print job from a printing apparatus;
determining whether processing corresponding to a print setting of the print job has been executed by the printing apparatus, based on the acquired processing status of the print job;
storing conflict information in a storage medium if it is determined that the processing corresponding to the print setting of the print job has not been executed, to prohibit the print setting from being applied to at least the printing apparatus; and
determining based on the conflict information whether processing corresponding to a print setting of a print job to be executed according to an instruction of a user can be executed by a printing apparatus serving as an output destination of the print job.

12. A non-transitory computer-readable storage medium storing a computer program for causing a computer to execute operations, the computer program comprising computer-executable instructions for:
acquiring an processing status of a print job from a printing apparatus;
determining whether processing corresponding to a print setting of the print job has been executed by the printing apparatus, based on the acquired processing status of the print job;
storing conflict information in a storage medium if it is determined that the processing corresponding to the print setting of the print job has not been executed, to prohibit the print setting from being applied to at least the printing apparatus; and
determining based on the conflict information whether processing corresponding to a print setting of a print job to be executed according to an instruction of a user can be executed by a printing apparatus serving as an output destination of the print job.

* * * * *